(12) United States Patent
Wang et al.

(10) Patent No.: US 12,464,544 B2
(45) Date of Patent: Nov. 4, 2025

(54) COMMUNICATION METHOD, APPARATUS, AND SYSTEM

(71) Applicant: HUAWEI TECHNOLOGIES CO., LTD., Guangdong (CN)

(72) Inventors: Fei Wang, Shanghai (CN); Bing Yang, Shanghai (CN); Yingrui Li, Shanghai (CN); Zhenhua Zhang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 319 days.

(21) Appl. No.: 18/323,379

(22) Filed: May 24, 2023

(65) Prior Publication Data

US 2023/0300861 A1   Sep. 21, 2023

Related U.S. Application Data

(63) Continuation of application No. PCT/CN2020/134084, filed on Dec. 4, 2020.

(51) Int. Cl.
*H04W 4/06* (2009.01)
*H04W 72/0446* (2023.01)
*H04W 72/30* (2023.01)

(52) U.S. Cl.
CPC ........ *H04W 72/30* (2023.01); *H04W 72/0446* (2013.01)

(58) Field of Classification Search
CPC .......................... H04W 72/30; H04W 72/0446
See application file for complete search history.

(56) References Cited

U.S. PATENT DOCUMENTS

2023/0164524 A1 * 5/2023 Luo .................. H04W 4/08
                                                   370/329
2023/0284244 A1 * 9/2023 Xu ................... H04W 72/51
                                                   370/312

FOREIGN PATENT DOCUMENTS

EP         4236385 A1 *  8/2023  ............ H04W 72/30
WO  WO-2022116206 A1 *  6/2022  ............ H04W 72/30

OTHER PUBLICATIONS

3GPP TS 38.213 V16.3.0 (Sep. 2020), 3rd Generation Partnership Project; Technical Specification Group Radio Access Network; NR; Physical layer procedures for control (Release 16), total 179 pages.

(Continued)

*Primary Examiner* — Melvin C Marcelo

(57) ABSTRACT

This disclosure provides a communication method and apparatus. In the method, the first network device receives a first position from a second network device, where the first position is a position of one or more subframes occupied by first information; determines a first offset and configures a multicast-broadcast single-frequency network (MBSFN) subframe, where the first offset is for determining a second position, the second position is a position obtained by offsetting the first position by the first offset, the first range is a position that supports configuration of the MBSFN subframe, and a position of the MBSFN subframe includes the second position; and sends the first offset and first MBSFN configuration information to the second network device. According to the method, the second network device may send the first information on the MBSFN subframe, to avoid time-frequency resource conflicts between the first information and a cell reference signal (CRS).

18 Claims, 9 Drawing Sheets

(56) References Cited

OTHER PUBLICATIONS

3GPP TSG-RAN WG4 #94-e, R4-2001386, "LTE/NR spectrum sharing in band 48/n48", Ericsson, Eletronic Meeting, Feb. 24-Mar. 6, 2020, total 3 pages.

* cited by examiner

COMMUNICATION METHOD, APPARATUS, AND SYSTEM

CROSS-REFERENCE TO RELATED APPLICATIONS

This application is a continuation of International Application No. PCT/CN2020/134084, filed on Dec. 4, 2020, the disclosure of which is hereby incorporated by reference in its entirety.

TECHNICAL FIELD

This disclosure relates to the field of wireless communication technologies, and in particular, to a communication method, apparatus, and system.

BACKGROUND

Spectrum sharing is a technology for sharing an existing spectrum of long term evolution (long term evolution, LTE) with a new radio (new radio, NR) signal, or sharing a new spectrum of NR with an LTE signal, which can effectively improve spectrum utilization.

An LTE cell reference signal (cell reference signal, CRS) is sent in a full bandwidth. If the spectrum of LTE is directly shared with an NR signal, time-frequency resource conflicts exist between the LTE CRS and the NR signal. Currently, an LTE base station may send an LTE cell reference signal (cell reference signal, CRS) pattern to an NR base station. The NR base station may avoid a time-frequency position of the LTE CRS and send data and the LTE CRS pattern to an NR terminal device based on the received LTE CRS pattern. In this way, based on the LTE CRS pattern, the NR terminal device may not parse data of the time-frequency position in which the LTE CRS is located, but parse data of a time-frequency position except the time-frequency position of the LTE CRS, thereby implementing spectrum sharing between LTE and NR.

Before the NR terminal device accesses a network, the NR terminal device cannot obtain the LTE CRS pattern. In this case, the LTE base station may configure some subframes as multicast-broadcast single-frequency network (multicast-broadcast single-frequency network, MBSFN) subframes, and the MBSFN subframes may enable an NR synchronization signal and physical broadcast channel block (synchronization signal and physical broadcast channel block, SSB) to avoid interference from the LTE CRS, so that the NR terminal device can also implement the spectrum sharing between LTE and NR without the LTE CRS pattern.

However, numbers of subframes that are supported by a protocol and may be configured by LTE as MBSFNs are #1, #2, #3, #6, #7, and #8. In other words, the LTE base station can only configure some or all of the six subframes as MBSFN subframes. Numbers of subframes occupied by the NR SSB under 4 beams are #0 and #1. This means that subframes occupied by the NR SSB cannot all correspond to the MBSFN subframes (for example, the subframe #0), resulting in time-frequency resource conflicts between the NR SSB and the LTE CRS.

SUMMARY

This disclosure provides a communication method, apparatus, and system, to avoid time-frequency resource conflicts between an NR SSB and an LTE CRS in spectrum sharing.

According to a first aspect, an embodiment of this disclosure provides a communication method. The method may be performed by a first network device, or may be performed by a component (such as a processor, a chip, or a chip system) of the first network device. In the method, the first network device receives a first position from a second network device, where the first position is a position of one or more subframes occupied by first information; determines a first offset, where the first offset is for determining a second position, the second position is a position obtained by offsetting the first position by the first offset, the second position is located in a first range, and the first range is a position that supports configuration of a multicast-broadcast single-frequency network MBSFN subframe; and configures the MBSFN subframe, where a position of the MBSFN subframe includes the second position; and sends the first offset and the first MBSFN configuration information to the second network device, where the first MBSFN configuration information is for determining a configuration state of the MBSFN subframe in the first range.

Optionally, the first network device and the second network device may provide network services of different standards for a terminal device. For example, the first network device may be a module or device configured to implement an LTE network service function, and the second network device may be a module or device configured to implement an NR network service function.

According to the method, the first network device may determine the first offset and configure the MBSFN subframe based on the position of one or more subframes occupied by the first information. The first offset may be for determining a second position, where the second position is a position obtained by offsetting the one or more subframes by the first offset, and the second position is located in the position that supports the configuration of the MBSFN subframe. That is, the position configured with the MBSFN subframe includes the second position. This means that, after being offset by the first offset, the position of one or more subframes occupied by the first information may fall within the position of the MBSFN subframe. In other words, the second network device may send the first information on the MBSFN subframe based on the first offset. Because a CRS in the MBSFN subframe is located only on a time-frequency resource corresponding to a PDCCH, and there is no CRS on a time-frequency resource corresponding to a PDSCH, time-frequency resource conflicts between the first information and the CRS can be avoided by sending the first information on the MBSFN subframe, thereby implementing spectrum sharing between LTE and NR.

In a possible design, that the first network device configures the MBSFN subframe includes: The first network device may configure the MBSFN subframe based on the first position and the first offset.

According to this design, the first network device may configure the MBSFN subframe based on the position of one or more subframes occupied by the first information and the first offset, to ensure that, after being offset by the first offset, the position of one or more subframes occupied by the first information can fall within the position range of the configured MBSFN subframe, so that the second network device can send the first information on the MBSFN subframe, to avoid time-frequency resource conflicts between the first information and the CRS, thereby implementing spectrum sharing between LTE and NR. For example, the first network device may first determine, based on the first position and the first offset, the position obtained by offsetting the first position by the first offset, that is, the second position, and then configure the MBSFN subframe based on the second position, to ensure that the position of the MBSFN subframe includes the second position.

In a possible design, that the first network device determines the first offset includes: The first network device may determine the first offset based on the first position and the first range.

According to this design, because not all subframes in a frame can be configured as MBSFN subframes, the first network device may determine the first offset based on the first position and the first range, where the first range is the position that supports the configuration of the MBSFN subframe, to ensure that positions obtained by offsetting the position of one or more subframes occupied by the first information by the first offset can be all configured as MBSFN subframes.

In a possible design, the first offset is an integer greater than 0 and less than 10. According to this design, one frame includes 10 subframes, and the first offset may be an integer greater than 0 and less than 10.

In a possible design, the first information includes at least one of a synchronization signal and physical broadcast channel block, a system information block, other system information, and a paging message. According to this design, the first information may be an NR signal that may still have time-frequency resource conflicts with the CRS when the MBSFN subframe is used, for example, one or more of an SSB, a system information block, other system information, and a paging message.

According to a second aspect, an embodiment of this disclosure provides a communication method. The method may be performed by a second network device, or may be performed by a component (such as a processor, a chip, or a chip system) of the second network device. In the method, the second network device may send a first position to a first network device, where the first position is a position of one or more subframes occupied by first information; receive a first offset and first multicast-broadcast single-frequency network MBSFN configuration information from the first network device, where the first MBSFN configuration information is for determining a configuration state of an MBSFN subframe in a first range, and the first range is a position that supports configuration of the MBSFN subframe; and send, on a time domain resource corresponding to a second position, the first information to a first terminal device, where the second position is a position obtained by offsetting the first position by the first offset, and a position of the MBSFN subframe includes the second position.

Optionally, the first network device and the second network device may provide network services of different standards for a terminal device. For example, the first network device may be a module or device configured to implement an LTE network service function, and the second network device may be a module or device configured to implement an NR network service function.

According to the method, the second network device may send, to the first network device, the position of one or more subframes occupied by the first information. In this way, the first network device may determine the first offset and configure the MBSFN subframe based on the position of one or more subframes occupied by the first information. The second network device may receive the first offset and a first MBSFN subframe that are from the first network device. In this way, the second network device may determine, based on the first offset, a position obtained by offsetting the one or more subframes occupied by the first information by the first offset, that is, the second position, and then send, on the time domain resource corresponding to the second position, the first information to the first terminal device. Because the position of the MBSFN subframe includes the second position, the second network device sends, on the MBSFN subframe, the first information to the first terminal device. Because a CRS in the MBSFN subframe is located only on a time-frequency resource corresponding to a PDCCH, and there is no CRS on a time-frequency resource corresponding to a PDSCH, time-frequency resource conflicts between the first information and the CRS can be avoided by sending the first information on the MBSFN subframe, thereby implementing spectrum sharing between LTE and NR.

In a possible design, one or more subframes corresponding to the second position include a first subframe, the first subframe is located outside a second range, the second range is a range obtained by offsetting the first range by the first offset, and the method may further include: sending first indication information to the first terminal device, where the first indication information indicates to perform rate matching on a time domain resource corresponding to the first subframe.

According to this design, the second range is the range obtained by offsetting the first range by the first offset, that is, the second range is a position that is supported by the second network device side and may be configured as the MBSFN subframe. Although, after being offset by the first offset, the one or more subframes occupied by the first information fall within the position range of the MBSFN subframe, and the second network device sends the first information on the MBSFN subframe, for the second network device side, the one or more subframes corresponding to the second position may be located outside the second range, for example, the first subframe. This means that, the second network device cannot notify the first terminal device of a configuration state that the first subframe is an MBSFN subframe. Therefore, the second network device may send the first indication information to the first terminal device, to indicate the first terminal device to perform rate matching on the time domain resource corresponding to the first subframe, to successfully obtain the first information and/or data.

In a possible design, the method may further include: sending second MBSFN configuration information to the first terminal device, where the second MBSFN configuration information is for determining a configuration state of the MBSFN subframe in the second range, and the second range is the range obtained by offsetting the first range by the first offset.

According to this design, the first network device may send the second MBSFN configuration information to the first terminal device. In this way, the first terminal device can obtain downlink data without performing rate matching on a time domain resource corresponding to the MBSFN subframe. For example, the first MBSFN configuration information is subframes #1, #2, and #3, denoted as 111 000, the first offset is 1, the first range is subframes #1, #2, #3, #6, #7, and #8, and the second range is subframes #2, #3, #4, #7, #8, and #9. It is clear that the subframes #2 and #3 in the second range are valid for the MBSFN subframe. Therefore, the second MBSFN configuration information is subframes #2 and #3, denoted as 110 000.

In a possible design, the MBSFN subframe includes a second subframe, the second subframe is located outside the first range after being offset by the first offset, the second MBSFN configuration information includes second indication information, and the second indication information indicates to perform rate matching on a time domain resource corresponding to the second subframe.

According to this design, for the second network device side, after being offset by the first offset, the MBSFN subframe configured by the first network device may fall outside the first range, for example, the second subframe. In this case, although a position of the second subframe may be configured as an MBSFN subframe in the second network device side, the position of the second subframe cannot be configured as an MBSFN subframe in the first network device side. Therefore, the second network device may set a configuration state of the MBSFN subframe corresponding to the second subframe to 0, to indicate the first terminal device to perform rate matching on the time domain resource corresponding to the second subframe.

In a possible design, the MBSFN subframe includes a second subframe, the second subframe is located outside the first range after being offset by the first offset, and the method may further include: sending second indication information to the first terminal device, where the second indication information indicates to perform rate matching on a time domain resource corresponding to the second subframe.

According to this design, the second network device may indicate, through the MBSFN configuration information, the first terminal device to perform rate matching on the time domain resource corresponding to the second subframe, to successfully obtain the first information and/or the downlink data, and may further send the first indication information to the first terminal device, where the first indication information may indicate the first terminal device to perform rate matching on the time domain resource corresponding to the second subframe, to successfully obtain the first information and/or data.

In a possible design, the first offset is an integer greater than 0 and less than 10. According to this design, one frame includes 10 subframes, and the first offset may be an integer greater than 0 and less than 10.

In a possible design, the first information includes at least one of a synchronization signal and physical broadcast channel block, a system information block, other system information, and a paging message. According to this design, the first information may be an NR signal that may still have time-frequency resource conflicts with the CRS when the MBSFN subframe is used, for example, one or more of an SSB, a system information block, other system information, and a paging message.

According to a third aspect, an embodiment of this disclosure provides a communication apparatus. The communication apparatus may be a first network device, or a component (such as a processor, a chip, or a chip system) of the first network device. The communication apparatus may include units configured to perform the steps in the first aspect. For example, the communication apparatus may include a communication unit and a processing unit.

The communication unit may be configured to receive a first position from a second network device, where the first position is a position of one or more subframes occupied by first information.

The processing unit may be configured to determine a first offset, where the first offset is for determining a second position, the second position is a position obtained by offsetting the first position by the first offset, the second position is located in a first range, and the first range is a position that supports configuration of a multicast-broadcast single-frequency network MBSFN subframe; and configure the MBSFN subframe, where a position of the MBSFN subframe includes the second position.

The communication unit may be further configured to send the first offset and the first MBSFN configuration information to the second network device, where the first MBSFN configuration information is for determining a configuration state of the MBSFN subframe in the first range.

In a possible design, the processing unit may be configured to configure the MBSFN subframe based on the first position and the first offset.

In a possible design, the processing unit may be configured to determine the first offset based on the first position and the first range.

In a possible design, the first offset is an integer greater than 0 and less than 10.

In a possible design, the first information includes at least one of a synchronization signal and physical broadcast channel block, a system information block, other system information, and a paging message.

According to a fourth aspect, an embodiment of this disclosure provides a communication apparatus. The communication apparatus may be a second network device, or a component (such as a processor, a chip, or a chip system) of the second network device. The communication apparatus may include units configured to perform the steps in the second aspect. For example, the communication apparatus may include a communication unit.

The communication unit may be configured to: send a first position to a first network device, where the first position is a position of one or more subframes occupied by first information; receive a first offset and first multicast-broadcast single-frequency network MBSFN configuration information from the first network device, where the first MBSFN configuration information is for determining a configuration state of an MBSFN subframe in a first range, and the first range is a position that supports configuration of the MBSFN subframe; and send, on a time domain resource corresponding to a second position, the first information to a first terminal device, where the second position is a position obtained by offsetting the first position by the first offset, and a position of the MBSFN subframe includes the second position.

In a possible design, one or more subframes corresponding to the second position include a first subframe, the first subframe is located outside a second range, the second range is a range obtained by offsetting the first range by the first offset, and the communication unit may be further configured to: sending first indication information to the first terminal device, where the first indication information indicates to perform rate matching on a time domain resource corresponding to the first subframe.

In a possible design, the communication unit may be further configured to: send second MBSFN configuration information to the first terminal device, where the second MBSFN configuration information is for determining a configuration state of the MBSFN subframe in the second range, and the second range is the range obtained by offsetting the first range by the first offset.

In a possible design, the MBSFN subframe includes a second subframe, the second subframe is located outside the first range after being offset by the first offset, the second MBSFN configuration information includes second indication information, and the second indication information indicates to perform rate matching on a time domain resource corresponding to the second subframe.

In a possible design, the MBSFN subframe includes a second subframe, the second subframe is located outside the first range after being offset by the first offset, and the communication unit may be further configured to: send second indication information to the first terminal device, and the second indication information indicates to perform rate matching on a time domain resource corresponding to the second subframe.

In a possible design, the first offset is an integer greater than 0 and less than 10.

In a possible design, the first information includes at least one of a synchronization signal and physical broadcast channel block, a system information block, other system information, and a paging message.

According to a fifth aspect, an embodiment of this disclosure provides a communication apparatus. The communication apparatus includes a processor, configured to implement the method performed by the first network device in the first aspect. The communication apparatus may further include a memory, configured to store program instructions and data. The memory is coupled to the processor, and the processor may invoke and execute the program instructions stored in the memory, to implement any method performed by the first network device in the first aspect.

Optionally, the communication apparatus may further include a transceiver, and the transceiver is used by the communication apparatus to communicate with another device. For example, the another device is a second network device.

According to a sixth aspect, an embodiment of this disclosure provides a communication apparatus. The communication apparatus includes a processor, configured to implement the method performed by the second network device in the second aspect. The communication apparatus may further include a memory, configured to store program instructions and data. The memory is coupled to the processor, and the processor may invoke and execute the program instructions stored in the memory, to implement any method performed by the second network device in the second aspect.

Optionally, the communication apparatus may further include a transceiver, and the transceiver is used by the communication apparatus to communicate with another device. For example, the another device is a first network device or a second terminal device.

According to a seventh aspect, an embodiment of this disclosure provides a communication system, including a first network device that can implement the method provided in the first aspect, and a second network device that can implement the method provided in the second aspect.

According to an eighth aspect, an embodiment of this disclosure further provides a computer program. When the computer program is run on a computer, the computer is enabled to perform the method provided in any one of the foregoing aspects.

According to a ninth aspect, an embodiment of this disclosure further provides a computer-readable storage medium. The computer-readable storage medium stores a computer program, and when the computer program is executed by a computer, the computer is enabled to perform the method provided in any one of the foregoing aspects.

According to a tenth aspect, an embodiment of this disclosure further provides a chip. The chip is configured to read a computer program stored in a memory, to perform the method provided in any one of the foregoing aspects.

According to an eleventh aspect, an embodiment of this disclosure further provides a chip system. The chip system includes a processor, configured to support a computer apparatus in implementing the method provided in any one of the foregoing aspects.

In a possible design, the chip system further includes a memory, and the memory is configured to store a program and data that are necessary for the computer apparatus. The chip system may include a chip, or may include a chip and another discrete component.

It should be noted that, for technical effects of the third aspect to the eleventh aspect, refer to technical effects of the first aspect and the second aspect.

DESCRIPTION OF EMBODIMENTS

This disclosure provides a communication method and apparatus, to avoid time-frequency resource conflicts between an NR SSB and an LTE CRS in spectrum sharing. The method and the device are based on a same technical idea. The method and the apparatus have similar principles for resolving the problems. Therefore, for implementations of the device and the method, reference may be made to each other, and details of repeated parts are not described again.

For ease of understanding embodiments of this disclosure, the following describes a communication system to which embodiments of this disclosure are applicable.

Figure 1:
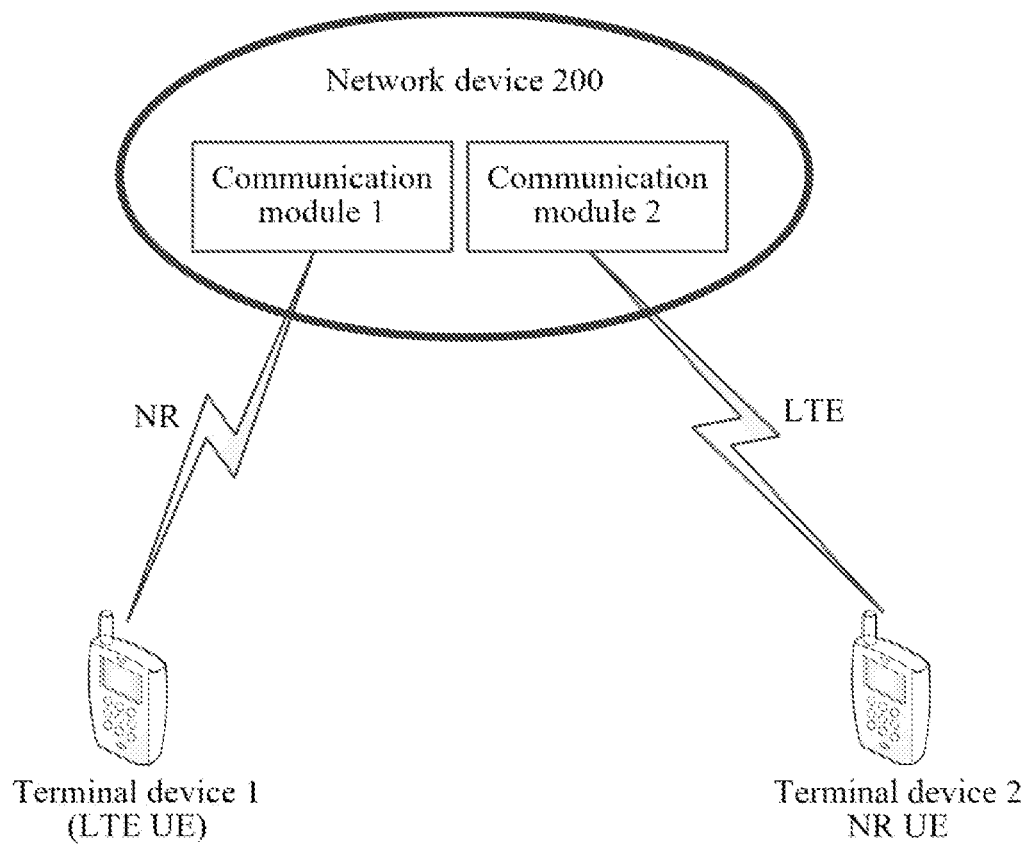
FIG. 1 is a schematic diagram of a structure of a communication system to which an embodiment of this disclosure is applicable.

FIG. 1 is a schematic diagram of a communication system to which an embodiment of this disclosure is applicable. As shown in FIG. 1, the communication system 100 may include a network device 200 and a terminal device. The network device 200 may include a plurality of communication modules. In FIG. 1, a communication module 1 and a communication module 2 are used as an example. The communication system 100 may include one or more terminal devices. In FIG. 1, a terminal device 1 and a terminal device 2 are used as an example. The network device 200 may separately establish RRC connections to the terminal device 1 and the terminal device 2, to provide network services for the terminal device 1 and the terminal device 2. For example, the communication module 1 in the network device 200 may communicate with the terminal device 1, and the communication module 2 in the network device 200 may communicate with the terminal device 2.

For example, the network device 200 may provide network services of different standards for the terminal device 1 and the terminal device 2. For example, the communication module 1 may provide an LTE network service for the terminal device 1, and the communication module 1 and the terminal device 1 may communicate with each other through a Uu interface. For example, the communication module 2 may provide an NR network service for the terminal device 2, and the communication module 2 and the terminal device 2 may communicate with each other through a Uu interface. Further, the communication module 1 and the communication module 2 may also communicate with each other.

The network device may be an access network device, for example, a radio access network (radio access network, RAN) device, and is a device that provides a wireless communication function for a terminal device. For example, the access network device includes but is not limited to: a next generation base station (generation NodeB, gNB) in a fifth generation (5$^{th}$ generation, 5G), an evolved NodeB (evolved NodeB, eNB), a remote radio unit (remote radio unit, RRU), a baseband unit (baseband unit, BBU), a transmitting and receiving point (transmitting and receiving point, TRP), a transmitting point (transmitting point, TP), a base station in a future mobile communication system, an access point in a Wi-Fi system, and the like. Alternatively, the access network device may be a radio controller, a central unit (central unit, CU), and/or a distributed unit (distributed unit, DU) in a cloud radio access network (cloud radio access network, CRAN) scenario, or the network device may be a relay station, a vehicle-mounted device, a network device in a future evolved network, and the like.

The terminal device may be briefly referred to as a terminal, or referred to as user equipment (user equipment, UE), and is a device having a wireless transceiver function. The terminal device may be deployed on land (for example, a vehicle-mounted, a vehicle, a high-speed railway, or a motor vehicle), or may be deployed on a water surface (for example, a ship), or may be deployed in the air (for example, an airplane, an uncrewed aerial vehicle, a balloon, or a satellite). The terminal device may be a mobile phone, a tablet computer, a computer having a wireless transceiver function, a virtual-reality terminal device, an augmented-reality terminal device, a wireless terminal device in industrial control, a wireless terminal device in self-driving, a wireless terminal device in telemedicine, a wireless terminal device in a smart grid, a wireless terminal device in transportation safety, a wireless terminal device in a smart city, or a wireless terminal device in a smart home. Alternatively, the terminal device may be a relay terminal device, for example, a mobile phone, a router, or an access device similar to a router that is deployed by an operator. This is not limited in this embodiment of this disclosure.

Figure 2:
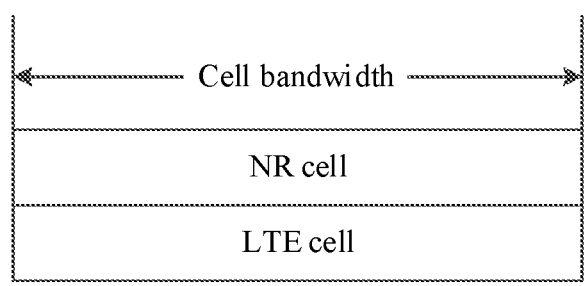
FIG. 2 is a schematic diagram of a cell bandwidth according to an embodiment of this disclosure.

It should be noted that, the communication method provided in this embodiment of this disclosure may be applied to a scenario of spectrum sharing between LTE and NR, and certainly, may also be applied to another scenario. This is not limited in this embodiment of this disclosure. For example, a bandwidth of an NR cell may be the same as a bandwidth of an LTE cell, as shown in FIG. 2. For example, the bandwidth of the NR cell may be less than or equal to 20 M.

It should be noted that, the communication system shown in FIG. 1 is used as an example, and constitutes no limitation on the communication system to which the method provided in embodiments of this disclosure is applicable. For example, the communication module 1 configured to implement an LTE network function and the communication module 2 configured to implement an NR network function may be a component (such as a processor, a chip, or a chip system) of the network device 200. In other words, the network device 200 may implement both the LTE network function and the NR network function. For another example, the communication module 1 configured to implement the LTE network function and the communication module 2 configured to implement the NR network function may be two independent network devices, and the two network devices may be in a co-located relationship. In this case, a thick line in FIG. 1 may be removed. For example, the communication module 1 is an LTE base station, and the communication module 2 is an NR base station.

For ease of description, the following description uses an example in which the communication module 1 is a communication module (or a network device) for implementing the LTE network service and the communication module 2 is a communication module (or a network device) for implementing the NR network service. Correspondingly, the terminal device 1 may be LTE UE, and the terminal device 2 may be NR UE.

The following describes some technical features in embodiments of this disclosure.

Spectrum sharing is a technology that can effectively improve spectrum utilization. For example, an existing spectrum of LTE is shared with an NR signal, or a new spectrum of NR is shared with an LTE signal. In the existing spectrum of LTE, an LTE CRS is sent in a full bandwidth. If the spectrum of LTE is directly shared with the NR signal, time-frequency resource conflicts exist between the LTE CRS and the NR signal.

Figure 3:
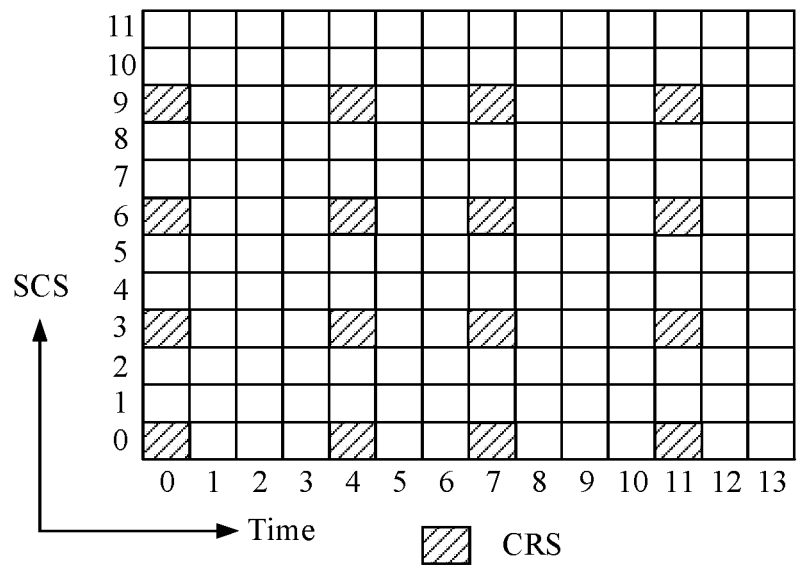
FIG. 3 is a schematic diagram of a CRS pattern according to an embodiment of this disclosure.
Figure 4:
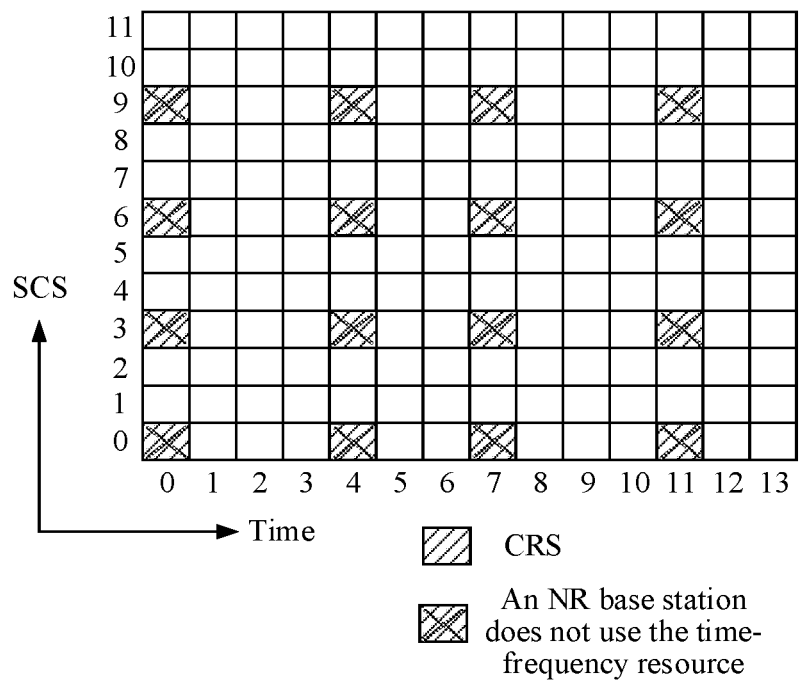
FIG. 4 is a schematic diagram depicting that an NR signal avoids a CRS according to an embodiment of this disclosure.

Currently, after the NR UE accesses a network, the LTE base station may send an LTE CRS pattern to the NR base station. In an example of 2CRS, the LTE base station sends CRSs on time-frequency resources corresponding to a symbol 0, a symbol 4, a symbol 7, and a symbol 11 in a subframe, as shown in FIG. 3. After receiving the LTE CRS pattern, the NR base station may avoid a time-frequency position of the LTE CRS and send data and the LTE CRS pattern to the NR UE based on the LTE CRS pattern. In other words, the NR base station sends data to the NR UE by using time-frequency resources except the time-frequency resources occupied by the CRSs, as shown in FIG. 4. In this way, based on the LTE CRS pattern, the NR UE may not parse data of the time-frequency position of the LTE CRS, but parse data of a time-frequency position except the time-frequency position of the LTE CRS, thereby implementing spectrum sharing between LTE and NR.

If NR UE in an idle (idle) state expects to access the network and enter a connected (connected) state, the NR UE may search for an SSB broadcast by the NR base station, synchronize with the NR base station based on the SSB, and complete an RRC connection with the NR base station. In this way, the NR UE accesses the network. After a concept of spectrum sharing is introduced, the NR base station may send an SSB using LTE spectrum resources, to improve spectrum resource utilization.

One SSB corresponds to one beam direction, and the NR base station may be deployed with a single beam, dual beams, four beams, or the like. Correspondingly, there may be 1, 2, or 4 SSBs, or the like. A sending periodicity of the SSBs may be 5 ms, 10 ms, 20 ms, or the like. Before the NR accesses the network, the sending periodicity of the SSBs is usually 20 ms. According to a protocol definition, a subframe #0, #1, #5, or #6 may be configured for an SSB, and one SSB occupies four orthogonal frequency division multiplexing (orthogonal frequency division multiplexing, OFDM) symbols (which may be briefly referred to as symbols). For example, when there are 4 SSBs and a sending periodicity of the SSBs is 20 ms, the subframes #0 and #1 may be configured for the SSBs, and two SSBs are sent in each subframe. For another example, when there are 4 SSBs and a sending periodicity of the SSBs is 5 ms, the subframes #0, #1, #5, and #6 may be configured for the SSBs.

Figure 5:
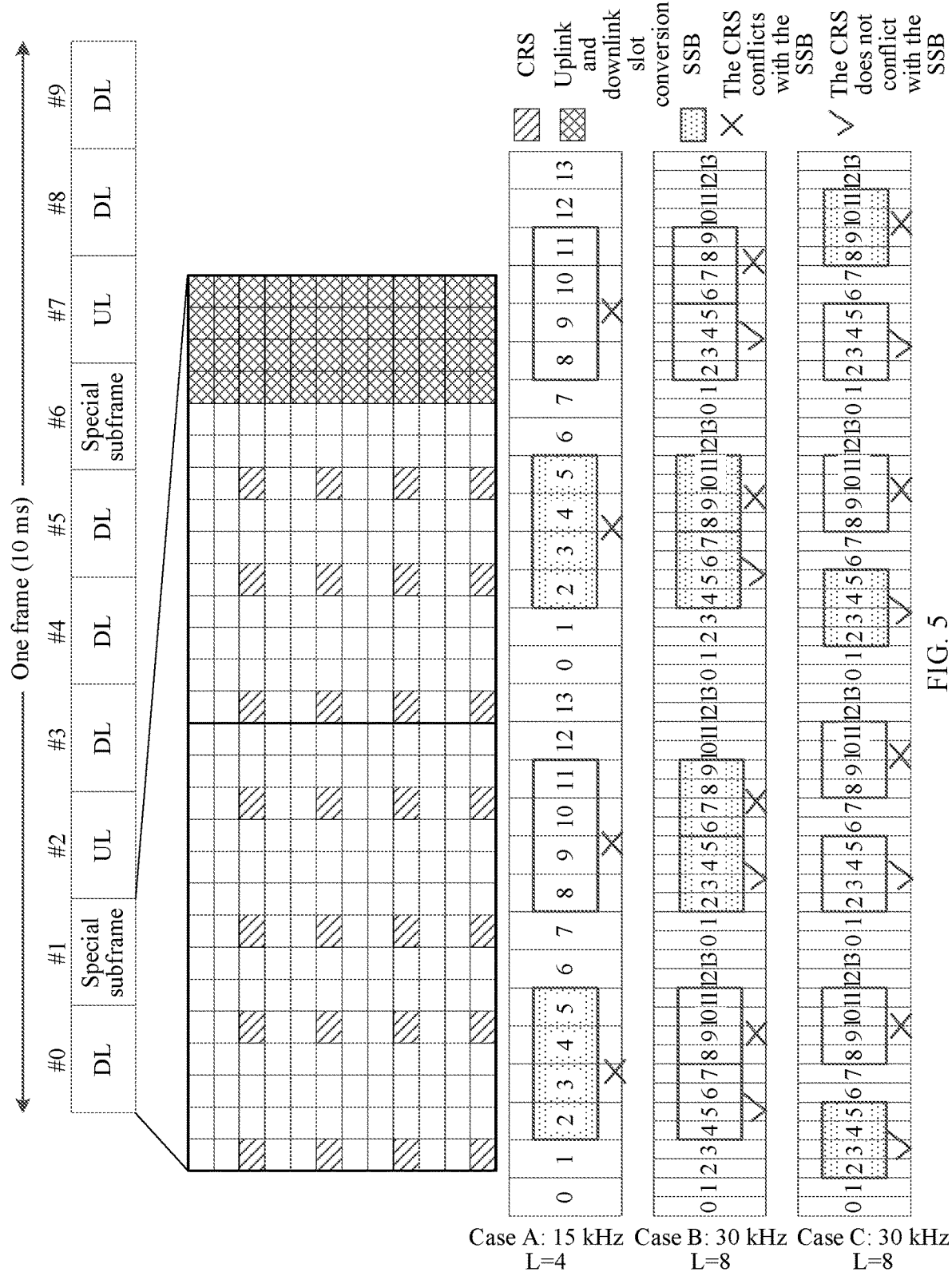
FIG. 5 is a schematic diagram of time-frequency resource conflicts between an SSB and a CRS according to an embodiment of this disclosure.

In an example of 2 ports (that is, 2CRS) in time division dual (time division dual, TDD), in the subframe #0, the CRSs occupy time-frequency resources corresponding to symbols 0, 4, 7, and 11; in the subframe #1, the CRSs occupy time-frequency resources corresponding to symbols 0, 4, and 7; and in addition, time-frequency resources corresponding to symbols 10 to 13 are for uplink and downlink slot conversion, as shown in FIG. 5.

In a case (case) A, a subcarrier spacing (subcarrier spacing, CSC) is 15 kHz, and there are 4 SSBs, that is, L=4. A first SSB and a second SSB respectively occupy symbols 2 to 5 and symbols 8 to 11 in the subframe #0, and a third SSB and a fourth SSB respectively occupy symbols 2 to 5 and symbols 8 to 11 in the subframe #1. The first SSB conflicts with CRSs on the symbol 4 in the subframe #0, the second SSB conflicts with CRSs on the symbol 11 in the subframe #0, the third SSB conflicts with CRSs on the symbol 4 in the subframe #1, and the fourth SSB conflicts with the uplink and downlink slot conversion.

In a case B, a CSC is 30 kHz, and there are 8 SSBs, that is, L=8. A first SSB and a second SSB occupy symbols 4 to 7 and symbols 8 to 11 in a first half subframe #0, a third SSB and a fourth SSB respectively occupy symbols 2 to 5 and symbols 6 to 9 in a last half subframe #0, a fifth SSB and a sixth SSB respectively occupy symbols 4 to 7 and symbols 8 to 11 in a first half subframe #1, and a seventh SSB and an eighth SSB respectively occupy symbols 2 to 5 and symbols 6 to 9 in a last half subframe #1. The second SSB conflicts with CRSs on the symbol 4 in the subframe #0, the fourth SSB conflicts with CRSs on the symbol 4 in the subframe #0, the sixth SSB conflicts with CRSs on the symbol 4 in the subframe #1, and the eighth SSB conflicts with the uplink and downlink slot conversion.

In a case C, a CSC is 30 kHz, and there are 8 SSBs, that is, L=8. A first SSB and a second SSB occupy symbols 2 to 5 and symbols 8 to 11 in a first half subframe #0, a third SSB and a fourth SSB respectively occupy symbols 2 to 5 and symbols 8 to 11 in a last half subframe #0, a fifth SSB and a sixth SSB respectively occupy symbols 2 to 5 and symbols 8 to 11 in a first half subframe #1, and a seventh SSB and an eighth SSB respectively occupy symbols 2 to 5 and symbols 8 to 11 in a last half subframe #1. The second SSB conflicts with CRSs on the symbol 4 in the subframe #0, the fourth SSB conflicts with CRSs on the symbol 4 in the subframe #0, the sixth SSB conflicts with CRSs on the symbol 4 in the subframe #1, and the eighth SSB conflicts with the uplink and downlink slot conversion.

In a case of 2 ports in TDD, time-frequency resource conflicts exist between the LTE CRSs and the SSBs regardless of whether there are 4 beams (4 SSBs) or 8 beams (SSB). Therefore, the NR base station cannot be deployed with 4 beams or 8 beams.

Figure 6:
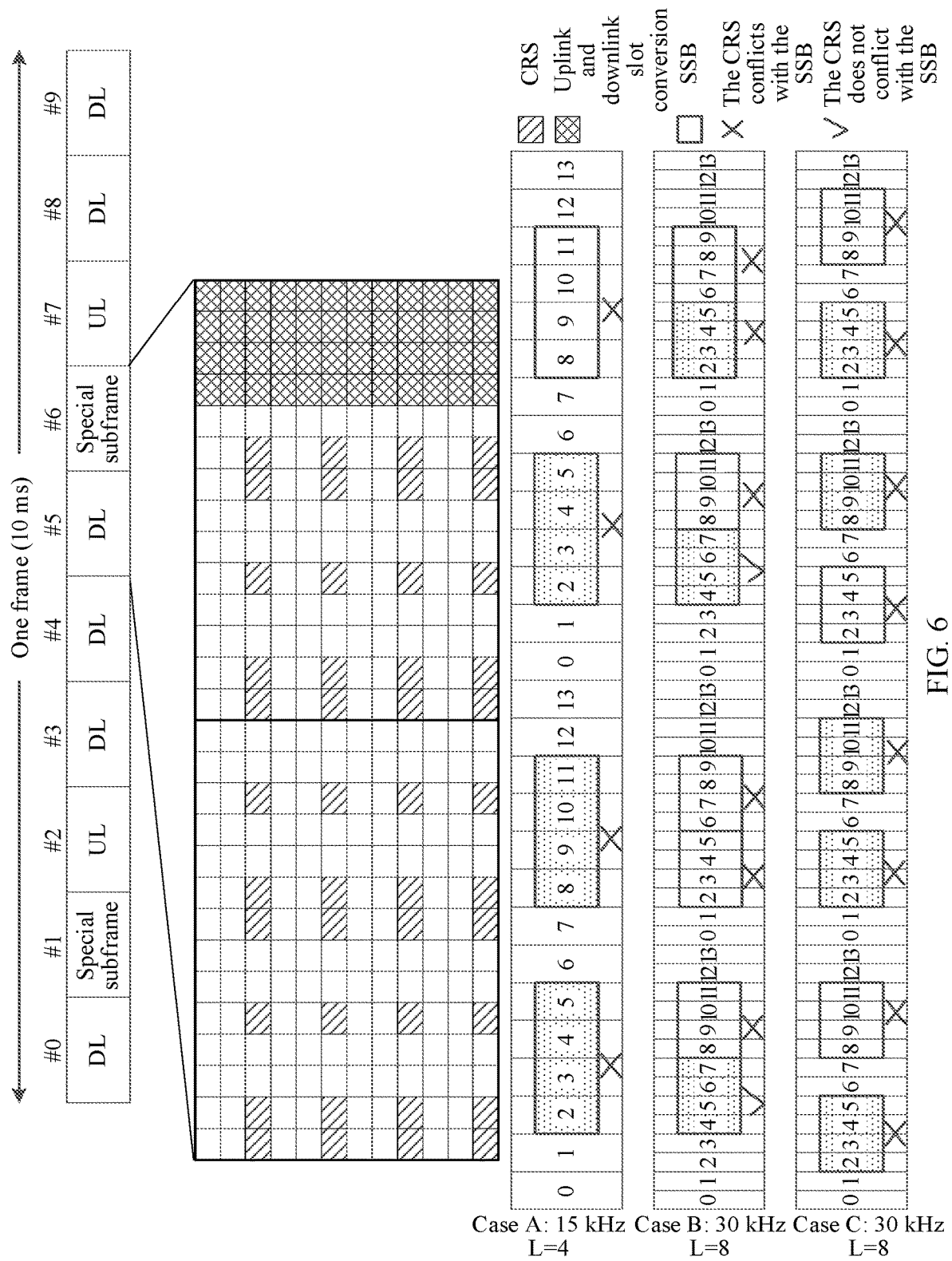
FIG. 6 is another schematic diagram of time-frequency resource conflicts between an SSB and a CRS according to an embodiment of this disclosure.

In an example of 4 ports (that is, 4CRS) in TDD, in the subframe #5, the CRSs occupy time-frequency resources corresponding to symbols 0, 1, 4, 7, 8, and 11; in the subframe #6, the CRSs occupy time-frequency resources corresponding to symbols 0, 1, 4, 7, and 8; and in addition, time-frequency resources corresponding to symbols 10 to 13 are for uplink and downlink slot conversion, as shown in FIG. 6.

In a case A, a CSC is 15 kHz, and there are 4 SSBs, that is, L=4. A first SSB and a second SSB respectively occupy symbols 2 to 5 and symbols 8 to 11 in the subframe #5, and a third SSB and a fourth SSB respectively occupy symbols 2 to 5 and symbols 8 to 11 in the subframe #6. The first SSB conflicts with CRSs on the symbol 4 in the subframe #5, the second SSB conflicts with CRSs on the symbols 8 and 11 in the subframe #5, the third SSB conflicts with CRSs on the symbol 4 in the subframe #6, and the fourth SSB conflicts with CRSs on the symbol 8 in the subframe #6 and the uplink and downlink slot conversion.

In a case B, a CSC is 30 kHz, and there are 8 SSBs, that is, L=8. A first SSB and a second SSB occupy symbols 4 to 7 and symbols 8 to 11 in a first half subframe #5, a third SSB and a fourth SSB respectively occupy symbols 2 to 5 and symbols 6 to 9 in a last half subframe #5, a fifth SSB and a sixth SSB respectively occupy symbols 4 to 7 and symbols 8 to 11 in a first half subframe #6, and a seventh SSB and an eighth SSB respectively occupy symbols 2 to 5 and symbols 6 to 9 in a last half subframe #6. The second SSB conflicts with CRSs on the symbol 4 in the subframe #5, the third SSB conflicts with CRSs on the symbol 8 in the subframe #5, the fourth SSB conflicts with CRSs on the symbol 11 in the subframe #5, the sixth SSB conflicts with CRSs on the symbol 4 in the subframe #6, and the seventh SSB conflicts with CRSs on the symbol 8 in the subframe #6 and the uplink and downlink slot conversion.

In a case C, a CSC is 30 kHz, and L is 8. A first SSB and a second SSB occupy symbols 2 to 5 and symbols 8 to 11 in a first half subframe #5, a third SSB and a fourth SSB respectively occupy symbols 2 to 5 and symbols 8 to 11 in a last half subframe #5, a fifth SSB and a sixth SSB respectively occupy symbols 2 to 5 and symbols 8 to 11 in a first half subframe #6, and a seventh SSB and an eighth SSB respectively occupy symbols 2 to 5 and symbols 8 to 11 in a last half subframe #6. The first SSB conflicts with CRSs on the symbol 1 in the subframe #5, the second SSB conflicts with CRSs on the symbol 4 in the subframe #5, the third SSB conflicts with CRSs on the symbol 8 in the subframe #5, the fourth SSB conflicts with CRSs on the symbol 11 in the subframe #5, the fifth SSB conflicts with CRSs on the symbol 1 in the subframe #6, the sixth SSB conflicts with CRSs on the symbol 4 in the subframe #6, the seventh SSB conflicts with CRSs on the symbol 8 in the subframe #6, the fourth SSB conflicts with the CRS on the symbol 11 in the subframe #5, and the eighth SSB conflicts with the uplink and downlink slot conversion.

In a case of 4 ports in TDD, time-frequency resource conflicts also exist between the LTE CRSs and the SSBs regardless of whether there are 4 beams (4 SSBs) or 8 beams (SSBs). Therefore, the NR base station cannot be deployed with 4 beams or 8 beams.

Figure 7:
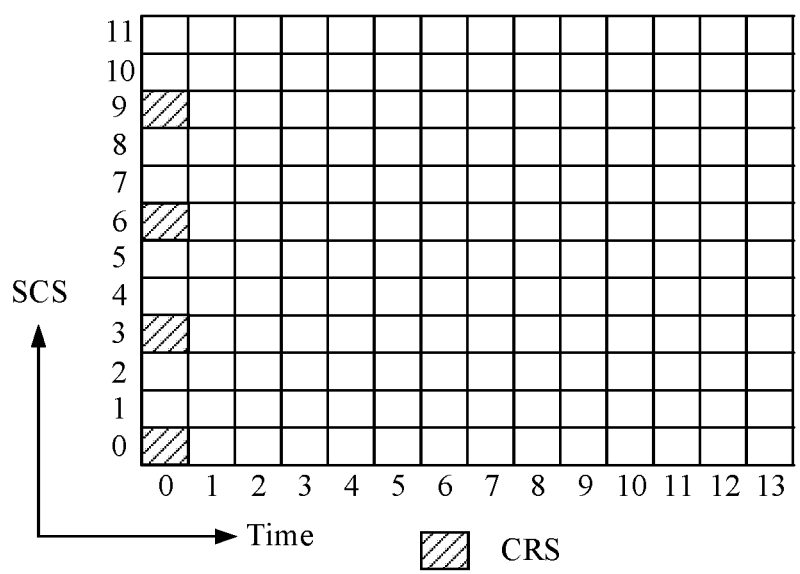
FIG. 7 is a schematic diagram of an MBSFN subframe according to an embodiment of this disclosure.

Considering that an LTE CRS in an MBSFN subframe exists in a symbol corresponding to a physical downlink control channel (physical downlink control channel, PDCCH), and there is no LTE CRS in a time-frequency resource corresponding to a physical downlink shared channel (physical downlink shared channel, PDSCH), a subframe occupied by an SSB may be configured as an MBSFN subframe to avoid the CRS. For example, the LTE CRS occupies only a symbol 1, as shown in FIG. 7.

According to a protocol definition, numbers of subframes that may be configured by LTE as MBSFNs are #1, #2, #3, #6, #7, and #8, and subframes occupied by SSBs are #0 and #1 (or #0, #1, #5, and #6). The LTE base station may notify the NR base station of a position of the MBSFN subframe, so that the NR base station sends the SSB on the MBSFN subframe. This means that, subframe numbers of the LTE base station side are aligned with subframe numbers of the NR base station side. In this way, one or more subframes occupied by the SSB cannot all be MBSFN subframes (for example, the subframe #0), resulting in time-frequency resource conflicts between the NR SSB and the LTE CRS.

In view of this, embodiments of this disclosure provide a communication method, apparatus, and system, to avoid time-frequency resource conflicts between an NR SSB and an LTE CRS in spectrum sharing. It may be understood that the NR SSB may be briefly referred to as an SSB, and the LTE CRS may be briefly referred to as a CRS.

It should be noted that, "a plurality of" in the following embodiments of this disclosure means two or more. In view of this, "a plurality of" in embodiments of this disclosure may also be understood as "at least two". "At least one" may be understood as one or more, for example, one, two, or more. For example, "include at least one" means "include one, two, or more", and there is no limitation on which is included. For example, "include at least one of A, B, and C" may mean "include A, B, or C", "include A and B, A and C, or B and C", or "include A, B, and C". "And/or" describes an association relationship for describing associated objects and represents that three relationships may exist. For example, A and/or B may represent the following three cases: Only A exists, both A and B exist, and only B exists. In addition, the character "/" usually indicates an "or" relationship between the associated objects unless otherwise specified.

Unless otherwise specified, ordinal numbers such as "first" and "second" in embodiments of this disclosure are used to distinguish between a plurality of objects, and are not intended to limit a sequence, a time sequence, priorities, or importance of the plurality of objects.

Figure 8:
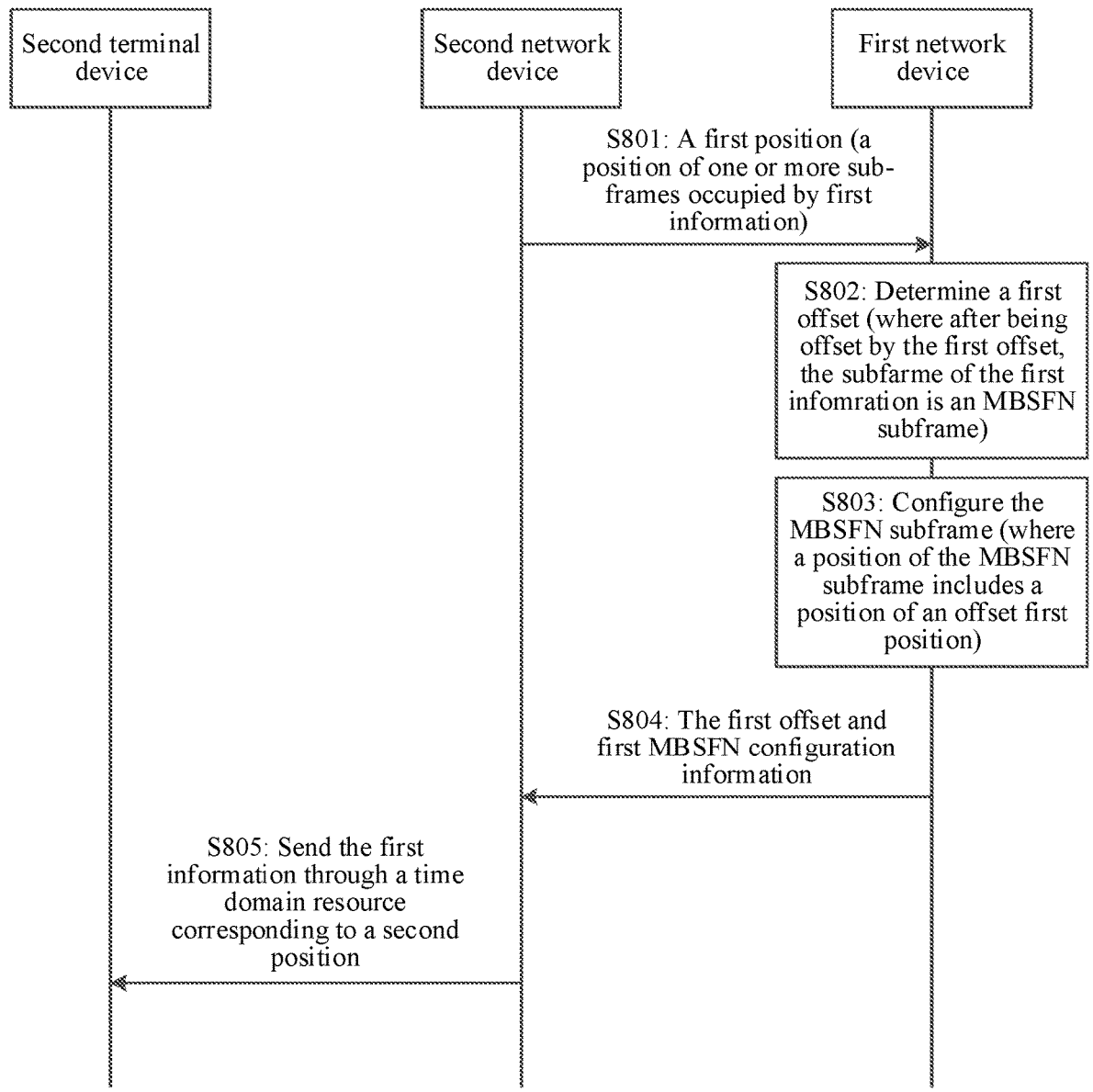
FIG. 8 is a schematic flowchart of a communication method according to an embodiment of this disclosure.

FIG. 8 is a schematic flowchart of a communication method according to an embodiment of this disclosure. The method may be applied to the communication system 100 shown in FIG. 1. For example, a first network device may be the communication module 1 shown in FIG. 1, a second network device may be the communication module 2 shown in FIG. 1, a second terminal device may be the terminal device 1 shown in FIG. 1, and a first terminal device may be the terminal device 2 shown in FIG. 1. In other words, the first network device may provide an LTE network service for the second terminal device, and the second network device may provide an NR network service for the first terminal device. As shown in FIG. 8, the schematic flowchart of the method may be shown as follows.

S801: The second network device sends a first position to the first network device. Correspondingly, the first network device receives the first position.

For example, the second network device may send the first position to the first network device, and the first position may be for configuring an MBSFN subframe. The first position may be a position of one or more subframes occupied by first information. For example, the first position may be a subframe number.

For example, the first information may refer to an NR signal that has a time-frequency resource conflict with an LTE CRS. In this embodiment of this disclosure, the first information may refer to an NR signal that may still have a time-frequency resource conflict with the LTE CRS when an MBSFN subframe is used. For example, the first information may be one or more of the following information.

(1) An SSB, which may be used by NR UE to synchronize with an NR base station. For example, the SSB may occupy at least one of subframes #0, #1, #5, and #6. For example, when the SSB occupies the subframe #0, a time-frequency resource conflict exists between the SSB and the CRS. For example, when the SSB occupies the subframe 5, a time-frequency resource conflict exists between the SSB and the CRS. For another example, when the SSB occupies the subframe #0 and the subframe 5, time-frequency resource conflicts exist between the SSB and the CRS.

(2) A system information block (system information block, SIB), which may provide, for the NR UE, a plurality of parameters required in a process such as cell camping, retransmission, or link establishment. For example, the SIB may occupy at least one of subframes #2, #3, #4, #5, and the like. For example, when the SIB occupies the subframe 5, a time-frequency resource conflict exists between the SSB and the CRS.

(3) Other system information (other system information, OSI), which may be for broadcasting of other cell information. For example, the OSI may occupy the subframe #5 and/or a subframe #7, and the like. For example, when the OSI occupies the subframe 5, a time-frequency subframe conflict exists between the OSI and the CRS.

(4) A paging (paging) message, which may be for sending a call request to NR UE in an idle state. For example, the paging message may occupy at least one of the subframes #2, #3, #5, and the like. For example, when the paging message occupies the subframe #5, a time-frequency resource conflict exists between the paging message and the CRS.

It can be understood that, the position of the subframe occupied by the first information is merely an example, and this is not limited in this embodiment of this disclosure.

For ease of understanding the technical solutions of this disclosure, an example in which the first information is an SSB is used in the following for description. It can be understood that, a technical solution applicable to the SSB may also be applicable to another NR signal (such as the SIB, the OSI, or the paging message) that has a time-frequency resource conflict with the CRS.

For example, the second network device may configure a subframe for the SSB, and send the first position to the first network device through RRC signaling. For example, the second network device may determine a quantity of SSBs based on a quantity of deployed beams, and then configure a subframe for the SSBs based on the quantity of the SSBs and a sending periodicity of the SSBs. For example, there is 1 SSB, and a sending periodicity of the SSB is 20 ms. The second network device may configure the subframe #1 for the SSB, and the first position is the subframe #1. For example, there are 4 SSBs, and a sending periodicity of the SSBs is 20 ms. The second network device may configure the subframe #0 and the subframe #1 for the SSBs, and the first position is the subframe #0 and the subframe #1. For another example, there are 4 SSBs, and a sending periodicity of the SSBs is 5 ms. The second network device may configure the subframes #0, #1, #5, and #6 for the SSBs, and the first position is the subframes #0, #1, #5, and #6.

Optionally, the second network device may send the quantity of the SSBs to the first network device. Correspondingly, the first network device receives the quantity of the SSBs. For example, the second network device may send the quantity of the SSBs to the first network device through the RRC signaling.

S802: The first network device determines a first offset.

For example, the first network device may determine the first offset, where the first offset may be for enabling one or more subframes occupied by the SSB to fall within a position range of the MBSFN subframe after the subframes are offset by the first offset. Optionally, the first offset may be an integer greater than or equal to 1 and less than or equal to 9.

Figure 9:
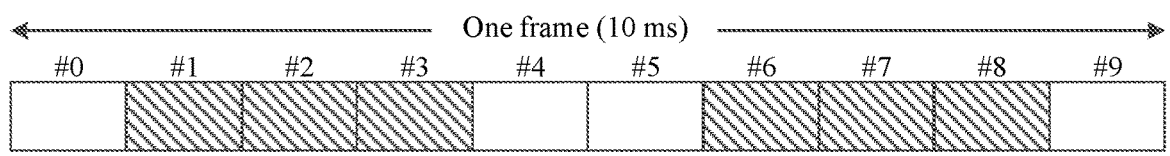
FIG. 9 is a schematic diagram of a first range according to an embodiment of this disclosure.

In an example, the first network device may determine the first offset based on the first position and a first range. The first range may be a position that supports configuration of the MBSFN subframe, that is, numbers of subframes that may be configured as MBSFNs defined by the protocol. For example, the first range may be subframes #1, #2, #3, #6, #7, and #8, as shown in FIG. 9. For example, the subframes occupied by the SSB are the subframes #0 and #1, and the first network device may determine that the first offset is any one of 1, 2, 6, and 7. For another example, the subframes occupied by the SSB are the subframes #0, #1, #5, and #6, and the first network device may determine that the first offset is 2 or 3. According to the method, because not all subframes in a frame can be configured as MBSFN subframes, the first network device may determine the first offset based on the first position and the first range, where the first range is the position that supports the configuration of the MBSFN subframe, to ensure that positions obtained by offsetting the position of one or more subframes occupied by the first information by the first offset can be all configured as MBSFN subframes.

In another example, the first offset may be predefined by a system. For example, the system predefines a first offset of 1. For another example, the first network device and the second network device may alternatively pre-agree that the first offset is 1 or 2.

S803: The first network device configures the MBSFN subframe.

For example, the first network device may configure one or more MBSFN subframes. For example, the first network device may configure one or more MBSFN subframes in the first range, for example, configure the subframe #1 and the subframe #2 as MBSFN subframes. For example, the first network device may configure one or more MBSFN subframes in the first range according to a predefinition. For example, the first network device and the second network device pre-agree on a quantity of configured MBSFN subframes and positions of the MBSFN subframes. For another example, the first network device may configure one or more MBSFB subframes based on the first position and the first offset.

In an example, the first network device may configure one or more MBSFN subframes in the first range based on the first position and the first offset. For example, the first network device may first determine a second position based on the first position and the first offset, and then configure one or more MBSFN subframes based on the second position. The second position may be a position obtained by offsetting the first position by the first offset, that is, a subframe number obtained by offsetting a subframe frame of the SSB by the first offset. In addition, the second position may be located in the first range. In this way, the position of the MBSFN subframe may include the second position, to ensure that after being offset by the first offset, the position of one or more subframes occupied by the SSB can fall within the position range of the configured MBSFN subframe, so that the second network device can send the SSB on the MBSFN subframe, thereby avoiding a time-frequency resource conflict between the SSB and the CRS, and implementing spectrum sharing between LTE and NR. For example, the first network device may first determine, based on the first position and the first offset, the position obtained by offsetting the first position by the first offset, that is, the second position, and then configure the MBSFN subframe based on the second position, to ensure that the position of the MBSFN subframe includes the second position.

For example, the first offset is 1, the first position is the subframe #0 and the subframe #1, and the first position after being offset by the first offset is the subframe #1 and the subframe #2, that is, the second position may be the subframe #1 and the subframe #2. In this case, based on the second position, the first network device may configure the subframe #1 and the subframe #2 as MBSFN subframes; or may configure the subframes #1, #2, and #3 as MBSFN subframes; or may configure the subframes #1, #2, and #6 as MBSFN subframes; or may configure the subframes #1, #2, and #7 as MBSFN subframes; or may configure the subframes #1, #2, and #8 as MBSFN subframes; or may configure the subframes #1, #2, #3, and #6 as MBSFN subframes; or may configure the subframes #1, #2, #3, and #7 as MBSFN subframes; or may configure the subframes #1, #2, #3, and #8 as MBSFN subframes; or may configure the subframes #1, #2, #6, and #7 as MBSFN subframes; or may configure the subframes #1, #2, #6, and #8 as MBSFN subframes; or may configure the subframes #1, #2, #7, and #8 as MBSFN subframes; or may configure the subframes #1, #2, #3, #6, #7, and #8 as MBSFN subframes.

For example, the first offset is 2, the first position is the subframes #0, #1, #5, and #6, and the first position after being offset by the first offset is the subframes #2, #3, #7, and #8, that is, the second position may be the subframes #2, #3, #7, and #8. In this case, based on the second position, the first network device may configure the subframes #2, #3, #7, and #8 as MBSFN subframes; or may configure the subframes #1, #2, #3, #7, and #8 as MBSFN subframes; or may configure the subframes #2, #3, #6, #7, and #8 as MBSFN subframes; or may configure the subframes #1, #2, #3, #6, #7, and #8 as MBSFN subframes.

It should be noted that, an execution sequence of the foregoing step S802 and step S803 is merely an example. This is not limited in this embodiment of this disclosure. For example, the first network device may first configure the MBSFN subframe, and then determine the first offset. For example, the first network device may configure one or more subframes as MBSFNs according to a predefinition, and then determine the first offset based on the position of the MBSFN subframe and the first position, that is, step S803 is first performed and then step S802 is performed.

For example, the first network device may configure the subframes #1, #2, and #3 as MBSFNs according to a predefinition, and the first position is the subframe #0 and the subframe #1. In this case, the first network device may determine, based on the position of the MBSFN subframe and the first position, that the first offset is 1 or 2, to ensure that the first position after being offset by the first offset can fall on the position of the MBSFN subframe. For another example, the first network device may configure the subframes #1, #2, #3, #6, #7, and #8 as MBSFNs according to a pre-negotiation result with the second network device, and the first position is subframes #0, #1, #5, and #6. In this case, the first network device may determine, based on the position of the MBSFN subframe and the first position, that the first offset is 1 or 2, to ensure that the first position after being offset by the first offset can fall on the position of the MBSFN subframe.

S804: The first network device sends the first offset and first MBSFN configuration information to the second network device. Correspondingly, the second network device receives the first offset and the first MBSFN configuration information.

For example, the first network device may send the first offset and the first MBSFN configuration information to the second network device. For example, the first network device may send the first offset and the first MBSFN configuration information to the second network device through RRC signaling. The first MBSFN configuration information may be for determining a configuration state of the MBSFN subframe in the first range, or may indicate the position of the MBSFN subframe.

For example, the first network device may send the first MBSFN configuration information to the second network device in a manner of 0/1.0 may indicate that a subframe is not configured as an MBSFN, and 1 may indicate that a subframe is configured as an MBSFN. For example, if the first network device configures the subframe #1 and the subframe #2 as MBSFNs, the first MBSFN configuration information may be represented as 110 000. For example, if the first network device configures the subframes #1, #2, and #8 as MBSFNs, the first MBSFN configuration information may be represented as 110 001. For another example, if the first network device configures the subframes #1, #2, #3, #6, #7, and #8 as MBSFNs, the first MBSFN configuration information may be represented as 111 111. It can be understood that, the first network device may alternatively indicate the position of the MBSFN subframe in another manner. This is not limited in this embodiment of this disclosure.

In a possible implementation, after the first network device configures the MBSFN subframe, the first network device may send the first MBSFN configuration information to the second terminal device.

S805: The second network device sends, on a time domain resource corresponding to the second position, the first information to the first terminal device. Correspondingly, the first terminal device receives the first information.

For example, the second network device may send, on the time domain resource corresponding to the second position, the first information to the first terminal device. For example, the second network device may determine the second position based on the first offset and the first position, and then send, on the time domain resource corresponding to the second position, the SSB to the first terminal device.

Figure 10:
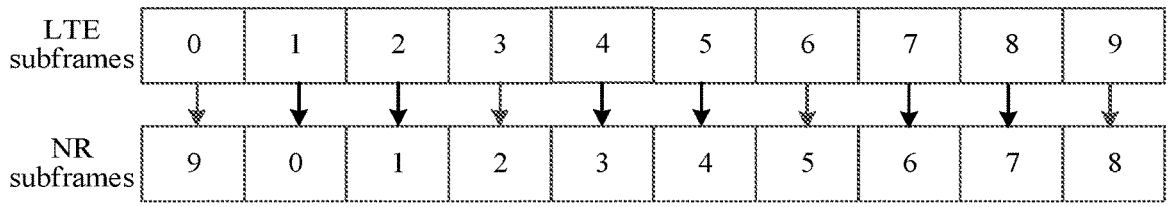
FIG. 10 is a schematic diagram of an LTE subframe and an NR subframe according to an embodiment of this disclosure.

It may be understood that, that the second network device sends, on the time domain resource corresponding to the second position, the first information to the first terminal device may be understood as that the second network device delays sending the first information to the first terminal device by the first offset. This means that subframe numbers of the first network device side are not aligned with subframe numbers of the second network device side. For example, the first offset is 1. At a same moment, a subframe #0 of the first network device side corresponds to a subframe #9 of the second network device side; a subframe #1 of the first network device side corresponds to a subframe #0 of the second network device side; a subframe #2 of the first network device side corresponds to a subframe #1 of the second network device side; a subframe #3 of the first network device side corresponds to a subframe #2 of the second network device side; a subframe #4 of the first network device side corresponds to a subframe #3 of the second network device side; a subframe #5 of the first network device side corresponds to a subframe #4 of the second network device side; a subframe #6 of the first network device side corresponds to a subframe #5 of the second network device side; a subframe #7 of the first network device side corresponds to a subframe #6 of the second network device side; a subframe #8 of the first network device side corresponds to a subframe #7 of the second network device side; and a subframe #9 of the first network device side corresponds to a subframe #8 of the second network device side, as shown in FIG. 10.

Figure 11:
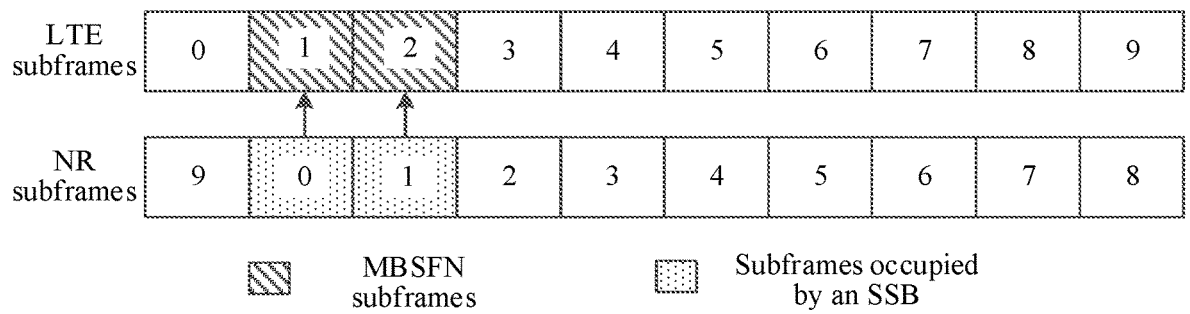
FIG. 11 is a schematic diagram of an MBSFN subframe and a subframe occupied by an SSB according to an embodiment of this disclosure.

For example, if the MBFSN subframe is the subframe #1 and the subframe #2, and the first offset is 1, the first position is the subframe #0 and the subframe #1. The first position after being offset by the first offset is the subframe #1 and the subframe #2, that is, the second position is the subframe #1 and the subframe #2, that is, subframe numbers corresponding to the first network device side are the subframe #1 and the subframe #2. The second network device may send, on the subframe #1 and the subframe #2 of NR, the SSB to the second terminal device. The second network device sends the SSB after performing subframe offset based on the first offset, in other words, the second network device delays sending the SSB by the first offset. For example, the first offset of 1 means that the sending is delayed by 1 ms. In this way, the subframe #0 and the subframe #1 of NR may actually correspond to the subframe 1 and the subframe #2 of LTE, and the subframe 1 and the subframe #2 of LTE are MBSFN subframes, that is, the SSB is sent on the MBSFN subframes, so that a time-frequency resource conflict between the SSB and the CRS can be avoided, as shown in FIG. 11.

In a possible implementation, one or more subframes corresponding to the second position include a first subframe, the first subframe is located outside a second range, and the second range is a range obtained by offsetting the first range by the first offset. In this case, the second network device may send first indication information to the first terminal device. The first indication information may indicate the second terminal device to perform rate matching on a time domain resource corresponding to the first subframe. Optionally, the first subframe may be the subframe #0, or the first subframe may be the subframe #5, or the first subframe may be the subframe #0 and the subframe #5.

The first range may be understood as a position range in which the first network device side supports to configure the MBSFN subframe, and the second range may be understood as a subframe range corresponding to the first network device side after the position range in which the second network device side supports to configure the MBSFN subframe is offset by a first offset. The second network device sends, based on the time domain resource corresponding to the second position, the first information to the first terminal device, and the second position falls on the position of the MBSFN subframe. However, one or more subframes corresponding to the offset first position may be located outside the second range, for example, the first subframe. This means that the second network device cannot notify the first terminal device of a configuration state that the first subframe is an MBSFN subframe. Therefore, the second network device may send the first indication information to the first terminal device, to indicate the first terminal device to perform rate matching on the time domain resource corresponding to the first subframe, to successfully obtain the first information and/or downlink data.

For example, in FIG. 10, the first range is the subframes #1, #2, #3, #6, #7, and #8, and the MBSFN subframes are the subframes #1, #2, and #3. The second range is the range obtained by offsetting the first range by the first offset, that is, the second range is the subframes #2, #3, #4, #7, #8, and #9, and the first position is the subframe #0 and subframe #1. In this case, the second position is the subframe #1 and the subframe #2. For the second network device, the subframe #0 corresponds to the subframe #1 of the first network device side, that is, the first network device sends the SSB on the MBSFN subframe. However, for the first network device, the subframe #0 is not in a range that may be configured as an MBSFN subframe defined by the protocol. Because the first network device may notify the first terminal device whether MBSFNs are configured in the subframes 1, #2, #3, #6, #7, and #8, the first network device cannot notify the first terminal device of a configuration state that the subframe #0 is an MBSFN subframe. In this case, the second network device may send the first indication information to the first terminal device, to indicate the first terminal device to perform rate matching on the time domain resource corresponding to the first subframe, to successfully obtain the first information and/or data, thereby implementing spectrum sharing between NR and LTE.

In a possible implementation, the second network device may send second MBSFN configuration information to the first terminal device. The second MBSFN configuration information may be for determining a configuration state of the MBSFN subframe in the second range, or may indicate a valid MBSFN subframe of the MBSFN subframes in the second range. According to this design, the first network device may send the second MBSFN configuration information to the first terminal device. In this way, the first terminal device can obtain the first information and/or downlink data without performing rate matching on a time domain resource corresponding to the MBSFN subframe.

Figure 12:
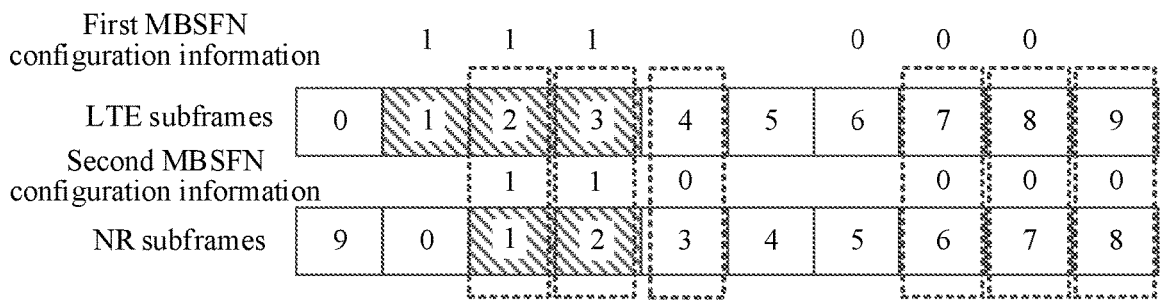
FIG. 12 is a schematic diagram of first MBSFN configuration information and second MBSFN configuration information according to an embodiment of this disclosure.

For example, in FIG. 10, the first range is the subframes #1, #2, #3, #6, #7, and #8, and the second range is the subframes #2, #3, #4, #7, #8, and #9. The MBSFN subframes are the subframes #1, #2, and #3, and corresponding first MBSFN configuration information may be 111 000. After NR subframes are offset by the first offset, the subframes #0, #1, and #2 in the NR subframes correspond to MBSFN subframes in LTE. However, for the NR base station, subframes that may be configured as MBSFNs are still #1, #2, #3, #6, #7, and #8, that is, the NR subframe #1 corresponds to an LTE subframe #2, the NR subframe #2 corresponds to an LTE subframe #3, and the NR subframe #3 corresponds to an LTE subframe #4. However, the LTE subframe #4 does not support configuration of the MBSFN subframe. Therefore, the NR base station may set the NR subframe #3 to 0, that is, the second MBSFN configuration information is 110 000, as shown in FIG. 12.

In an example, the second MBSFN configuration information may include second indication information, and the second indication information may indicate the second terminal device to perform rate matching on a time domain resource corresponding to a second subframe. The second subframe may be an MBSFN subframe, and the second subframe after being offset by the first offset is located outside the first range. For the second network device side, after being offset by the first offset, the MBSFN subframe configured by the first network device may fall outside the first range, for example, the second subframe. In this case, in the second network device side, a position of the second subframe may be configured as an MBSFN subframe, that is, the second network device may notify the second subframe whether to configure an MBSFN subframe. However, in the first network device side, the position of the second subframe cannot be configured as an MBSFN subframe. Therefore, the second network device may set a configuration state of the MBSFN subframe corresponding to the second subframe to 0, to indicate the first terminal device to perform rate matching on the time domain resource corresponding to the second subframe. For example, in FIG. 12, the second subframe may be the subframe #3 and the subframe #8 in the NR subframes.

In another possible implementation, the second network device may send the second indication information to the first terminal device. For example, the second network device may send the second indication information to the first terminal device through RRC signaling. The second indication information may indicate the first terminal device to perform rate matching on the time domain resource corresponding to the second subframe. The second subframe may be an MBSFN subframe, and the second subframe after being offset by the first offset is located outside the first range. According to this design, the second network device may indicate, through the MBSFN configuration information, the first terminal device to perform rate matching on the time domain resource corresponding to the second subframe, to successfully obtain the first information and/or the downlink data, and may further send the second indication information to the first terminal device, where the second indication information may indicate the first terminal device to perform rate matching on the time domain resource corresponding to the second subframe, to successfully obtain the first information and/or the data.

In the foregoing embodiment of this disclosure, the first network device may determine the first offset and configure the MBSFN subframe based on the position of one or more subframes occupied by the first information. The first offset may be for determining a second position, where the second position is a position obtained by offsetting the one or more subframes by the first offset, and the second position is located in the position that supports the configuration of the MBSFN subframe. That is, the position configured with the MBSFN subframe includes the second position. This means that, after being offset by the first offset, the position of one or more subframes occupied by the first information may fall within the position of the MBSFN subframe. In other words, the second network device may send the first information on the MBSFN subframe based on the first offset. Because a CRS in the MBSFN subframe is located only on a time-frequency resource corresponding to a PDCCH, and there is no CRS on a time-frequency resource corresponding to a PDSCH, time-frequency resource conflicts between the first information and the CRS can be avoided by sending the first information on the MBSFN subframe, thereby implementing spectrum sharing between LTE and NR.

In the foregoing embodiment provided in this disclosure, the method provided in embodiments of this disclosure is described from perspectives of the first network device, the second network device, and interaction between the first network device and the second network device. To implement functions in the method provided in the foregoing embodiment of this disclosure, the first network device and the second network device may include a hardware structure and/or a software module, to implement the foregoing functions in a form of a hardware structure, a software module, or a combination of a hardware structure and a software module. Whether a specific function in the foregoing functions is performed in a manner of a hardware structure, a software module, or a combination of a hardware structure and a software module depends on specific application and a design constraint of the technical solutions.

Figure 13:
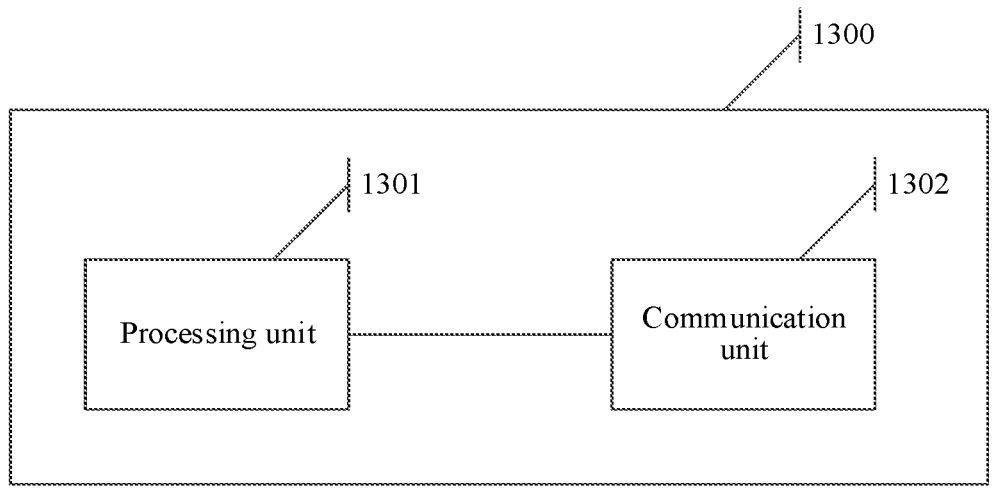
FIG. 13 is a schematic diagram of a structure of a communication apparatus according to an embodiment of this disclosure.

FIG. 13 is a schematic diagram of a structure of a communication apparatus 1300. The communication apparatus 1300 may be the first network device in the embodiment shown in FIG. 8, and can implement functions of the first network device in the method provided in embodiments of this disclosure. Alternatively, the communication apparatus 1300 may be an apparatus that can support the first network device in implementing the functions of the first network device in the method provided in embodiments of this disclosure. The communication apparatus 1300 may be a hardware structure, a software module, or a combination of a hardware structure and a software module. The communication apparatus 1300 may be implemented by a chip system. In this embodiment of this disclosure, the chip system may include a chip, or may include a chip and another discrete component.

The communication apparatus 1300 may include a processing unit 1301 and a communication unit 1302.

The communication unit 1302 may be configured to receive a first position from a second network device, where the first position is a position of one or more subframes occupied by first information.

The processing unit 1301 may be configured to determine a first offset, where the first offset is for determining a second position, the second position is a position obtained by offsetting the first position by the first offset, the second position is located in a first range, and the first range is a position that supports configuration of a multicast-broadcast single-frequency network MBSFN subframe; and configure the MBSFN subframe, where a position of the MBSFN subframe includes the second position.

The communication unit 1302 may be further configured to send the first offset and the first MBSFN configuration information to the second network device, where the first MBSFN configuration information is for determining a configuration state of the MBSFN subframe in the first range.

In a possible design, the processing unit 1301 may be configured to configure the MBSFN subframe based on the first position and the first offset.

In a possible design, the processing unit 1301 may be configured to determine the first offset based on the first position and the first range.

In a possible design, the first offset is an integer greater than 0 and less than 10.

In a possible design, the first information includes at least one of a synchronization signal and physical broadcast channel block, a system information block, other system information, and a paging message.

The communication unit 1302 is used by the communication apparatus 1300 to communicate with another module, and may be a circuit, a component, an interface, a bus, a software module, a transceiver, or any another apparatus that can implement communication.

All related content of the steps in the foregoing method embodiments may be cited in function descriptions of the corresponding functional modules. Details are not described herein again.

Module division in this embodiment of this disclosure is an example, and is merely logical function division. In an actual implementation, there may be another division manner. In addition, various functional modules in this embodiment of this disclosure may be integrated into one processor or may exist alone physically, or two or more modules may be integrated into one module. The integrated module may be implemented in a form of hardware, or may be implemented in a form of a software functional module.

Figure 14:
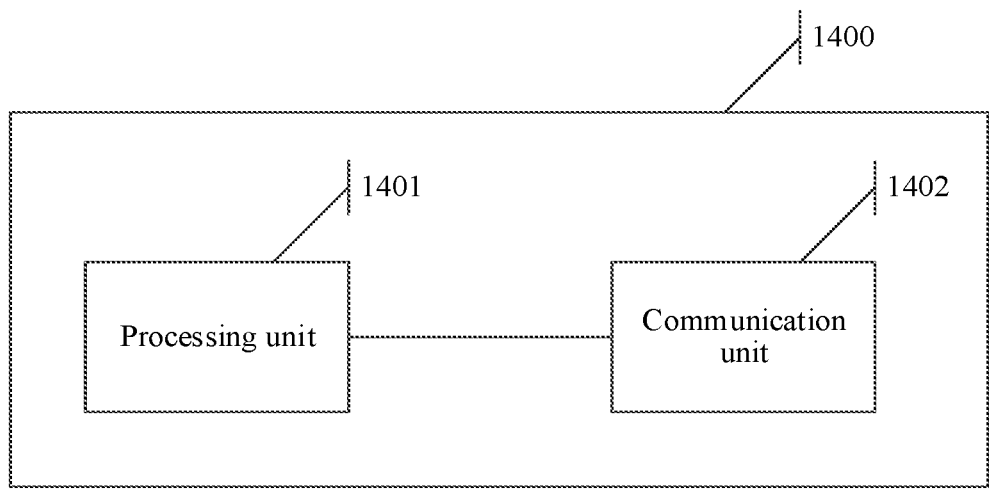
FIG. 14 is a schematic diagram of a structure of a communication apparatus according to an embodiment of this disclosure.

FIG. 14 is a schematic diagram of a structure of a communication apparatus 1400. The communication apparatus 1400 may be the second network device in the embodiment shown in FIG. 8, and can implement functions of the second network device in the method provided in embodiments of this disclosure. Alternatively, the communication apparatus 1400 may be an apparatus that can support the second network device in implementing the functions of the second network device in the method provided in embodiments of this disclosure. The communication apparatus 1400 may be a hardware structure, a software module, or a combination of a hardware structure and a software module. The communication apparatus 1400 may be implemented by a chip system. In this embodiment of this disclosure, the chip system may include a chip, or may include a chip and another discrete component.

The communication apparatus 1400 may include a processing unit 1401 and a communication unit 1402.

The communication unit 1402 may be configured to: send a first position to a first network device, where the first position is a position of one or more subframes occupied by first information; receive a first offset and first multicast-broadcast single-frequency network MBSFN configuration information from the first network device, where the first MBSFN configuration information is for determining a configuration state of an MBSFN subframe in a first range, and the first range is a position that supports configuration of the MBSFN subframe; and send, on a time domain resource corresponding to a second position, the first information to a first terminal device, where the second position is a position obtained by offsetting the first position by the first offset, and a position of the MBSFN subframe includes the second position.

In a possible design, one or more subframes corresponding to the second position include a first subframe, the first subframe is located outside a second range, the second range is a range obtained by offsetting the first range by the first offset, and the communication unit 1402 may be further configured to: sending first indication information to the first terminal device, where the first indication information indicates to perform rate matching on a time domain resource corresponding to the first subframe.

In a possible design, the communication unit 1402 may be further configured to: send second MBSFN configuration information to the first terminal device, where the second MBSFN configuration information is for determining a configuration state of the MBSFN subframe in the second range, and the second range is the range obtained by offsetting the first range by the first offset.

In a possible design, the MBSFN subframe includes a second subframe, the second subframe is located outside the first range after being offset by the first offset, the second MBSFN configuration information includes second indication information, and the second indication information indicates to perform rate matching on a time domain resource corresponding to the second subframe.

In a possible design, the MBSFN subframe includes a second subframe, the second subframe is located outside the first range after being offset by the first offset, and the communication unit 1402 may be further configured to: send second indication information to the first terminal device, and the second indication information indicates to perform rate matching on a time domain resource corresponding to the second subframe.

In a possible design, the first offset is an integer greater than 0 and less than 10.

In a possible design, the first information includes at least one of a synchronization signal and physical broadcast channel block, a system information block, other system information, and a paging message.

The communication unit 1402 is used by the communication unit 1400 to communicate with another module, and may be a circuit, a component, an interface, a bus, a software module, a transceiver, or any another apparatus that can implement communication.

All related content of the steps in the foregoing method embodiments may be cited in function descriptions of the corresponding functional modules. Details are not described herein again.

Module division in this embodiment of this disclosure is an example, and is merely logical function division. In an actual implementation, there may be another division manner. In addition, various functional modules in this embodiment of this disclosure may be integrated into one processor or may exist alone physically, or two or more modules may be integrated into one module. The integrated module may be implemented in a form of hardware, or may be implemented in a form of a software functional module.

Figure 15:
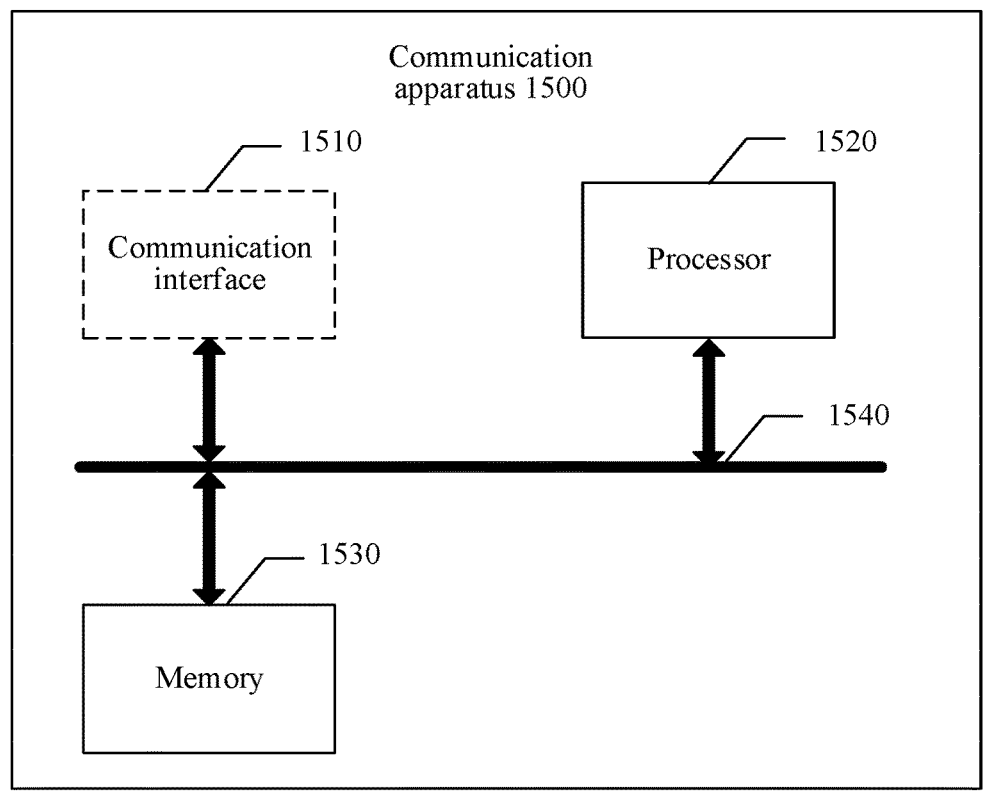
FIG. 15 is a schematic diagram of another structure of a communication apparatus according to an embodiment of this disclosure.

FIG. 15 shows a communication apparatus 1500 according to an embodiment of this disclosure. The communication apparatus 1500 may be the first network device in the embodiment shown in FIG. 8, and can implement functions of the first network device in the method provided in embodiments of this disclosure. Alternatively, the communication apparatus 1500 may be an apparatus that can support the first network device in implementing the functions of the first network device in the method provided in embodiments of this disclosure. The communication apparatus 1500 may be a chip system. In this embodiment of this disclosure, the chip system may include a chip, or may include a chip and another discrete component.

In hardware implementation, the communication unit 1302 may be a transceiver, and the transceiver is integrated into the communication apparatus 1500 to form a communication interface 1510.

The communication apparatus 1500 includes at least one processor 1520, configured to implement or support the communication apparatus 1500 in implementing functions of the first network device in the method provided in embodiments of this disclosure. For example, the processor 1520 may determine the first offset, and configure an MBSFN subframe. For details, refer to the detailed description in the method example. Details are not described herein again.

The communication apparatus 1500 may further include at least one memory 1530 that is configured to store program instructions and/or data. The memory 1530 is coupled to the processor 1520. Couplings in this embodiment of this disclosure are indirect couplings or communication connections between apparatuses, units, or modules, may be electrical, mechanical, or in another form, and are used for information exchange between the apparatuses, the units, or the modules. The processor 1520 may cooperate with the memory 1530. The processor 1520 may execute the program instructions stored in the memory 1530. At least one of the at least one memory may be included in the processor.

The communication apparatus 1500 may further include a communication interface 1510, configured to communicate with another device through a transmission medium, so that an apparatus in the communication apparatus 1500 can communicate with the another device. For example, the another device may be a second network device or a second terminal device. The processor 1520 may send and receive data through the communication interface 1510. The communication interface 1510 may be specifically a transceiver.

A specific connection medium between the communication interface 1510, the processor 1520, and the memory 1530 are not limited in this embodiment of this disclosure. In this embodiment of this disclosure, in FIG. 15, the memory 1530, the processor 1520, and the communication interface 1510 are connected to each other through a bus 1540. The bus is represented by a thick line in FIG. 15. A manner of connection between other components is only schematically described, but is not used as a limitation. The bus may be classified as an address bus, a data bus, a control bus, or the like. For ease of description, the bus in FIG. 15 is represented by only one thick line, but which does not indicate that there is only one bus or one type of bus.

In this embodiment of this disclosure, the processor 1520 may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in the embodiments of this disclosure. The general purpose processor may be a microprocessor, or any conventional processor. Steps of the methods disclosed with reference to embodiments of this disclosure may be directly executed and completed by a hardware processor, or may be executed and completed by a combination of hardware and software modules in the processor.

In this embodiment of this disclosure, the memory 1530 may be a non-volatile memory, such as a hard disk (hard disk drive, HDD) or a solid-state drive (solid-state drive, SSD), or may be a volatile memory (volatile memory), such as a random-access memory (random-access memory, RAM). The memory is any other medium that can carry or store expected program code in a form of instructions or a data structure and can be accessed by a computer, but is not limited thereto. The memory in this embodiment of this disclosure may be further a circuit or any other apparatus that can implement a storage function, and is configured to store program instructions and/or data.

Figure 16:
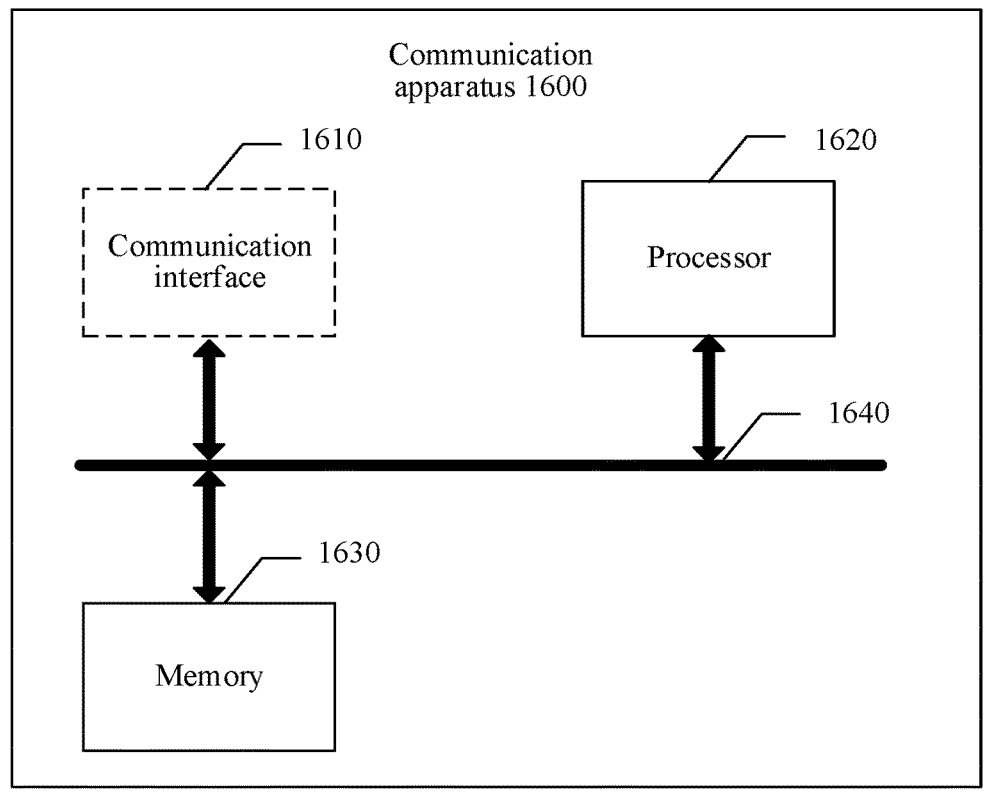
FIG. 16 is a schematic diagram of another structure of a communication apparatus according to an embodiment of this disclosure.

FIG. 16 shows a communication apparatus 1600 according to an embodiment of this disclosure. The communication apparatus 1600 may be the second network device in the embodiment shown in FIG. 8, and can implement functions of the second network device in the method provided in embodiments of this disclosure. Alternatively, the communication apparatus 1600 may be an apparatus that can support the second network device in implementing the functions of the second network device in the method provided in embodiments of this disclosure. The communication apparatus 1600 may be a chip system. In this embodiment of this disclosure, the chip system may include a chip, or may include a chip and another discrete component.

In hardware implementation, the communication unit 1402 may be a transceiver, and the transceiver is integrated into the communication apparatus 1600 to form a communication interface 1610.

The communication apparatus 1600 includes at least one processor 1620, configured to implement or support the communication apparatus 1600 in implementing functions of the second network device in the method provided in embodiments of this disclosure. For example, the processor 1620 may determine a second position based on a first offset. For details, refer to the detailed description in the method example. Details are not described herein again.

The communication apparatus 1600 may further include at least one memory 1630 that is configured to store program instructions and/or data. The memory 1630 is coupled to the processor 1620. Couplings in this embodiment of this disclosure are indirect couplings or communication connections between apparatuses, units, or modules, may be electrical, mechanical, or in another form, and are used for information exchange between the apparatuses, the units, or the modules. The processor 1620 may cooperate with the memory 1630. The processor 1620 may execute the program instructions stored in the memory 1630. At least one of the at least one memory may be included in the processor.

The communication apparatus 1600 may further include a communication interface 1610, configured to communicate with another device through a transmission medium, so that an apparatus in the apparatus 1600 can communicate with the another device. For example, the another device may be a first network device or a first terminal device. The processor 1620 may send and receive data through the communication interface 1610. The communication interface 1610 may be specifically a transceiver.

A specific connection medium between the communication interface 1610, the processor 1620, and the memory 1630 are not limited in this embodiment of this disclosure. In this embodiment of this disclosure, in FIG. 16, the memory 1630, the processor 1620, and the communication interface 1610 are connected to each other through a bus 1640. The bus is represented by a thick line in FIG. 16. A manner of connection between other components is only schematically described, but is not used as a limitation. The bus may be classified as an address bus, a data bus, a control bus, or the like. For ease of description, the bus in FIG. 16 is represented by only one thick line, but which does not indicate that there is only one bus or one type of bus.

In this embodiment of this disclosure, the processor 1620 may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in the embodiments of this disclosure. The general purpose processor may be a microprocessor, or any conventional processor. Steps of the methods disclosed with reference to embodiments of this disclosure may be directly executed and completed by a hardware processor, or may be executed and completed by a combination of hardware and software modules in the processor.

In this embodiment of this disclosure, the memory 1630 may be a non-volatile memory, such as a hard disk (hard disk drive, HDD) or a solid-state drive (solid-state drive, SSD), or may be a volatile memory (volatile memory), such as a random-access memory (random-access memory, RAM). The memory is any other medium that can carry or store expected program code in a form of instructions or a data structure and can be accessed by a computer, but is not limited thereto. The memory in this embodiment of this disclosure may be further a circuit or any other apparatus that can implement a storage function, and is configured to store program instructions and/or data.

An embodiment of this disclosure further provides a computer-readable storage medium, including instructions. When the instructions are run on a computer, the computer is enabled to perform the method performed by the first network device in the foregoing embodiments.

An embodiment of this disclosure further provides a computer-readable storage medium, including instructions. When the instructions are run on a computer, the computer is enabled to perform the method performed by the second network device in the foregoing embodiments.

An embodiment of this disclosure further provides a computer program product, including instructions. When the instructions are run on a computer, the computer is enabled to perform the method performed by the first network device in the foregoing embodiments.

An embodiment of this disclosure further provides a computer program product, including instructions. When the instructions are run on a computer, the computer is enabled to perform the method performed by the second network device in the foregoing embodiments.

An embodiment of this disclosure provides a chip system. The chip system includes a processor, and may further include a memory, configured to implement functions of the first network device in the foregoing methods. The chip system may include a chip, or may include a chip and another discrete component.

An embodiment of this disclosure provides a chip system. The chip system includes a processor, and may further include a memory, configured to implement functions of the second network device in the foregoing methods. The chip system may include a chip, or may include a chip and another discrete component.

An embodiment of this disclosure provides a communication system. The communication system includes the foregoing first network device and the second network device.

The methods provided in embodiments of this disclosure may be completely or partially implemented by software, hardware, firmware, or any combination thereof. When software is used for implementation, the methods may be implemented completely or partially in a form of a computer program product. The computer program product includes one or more computer instructions. When the computer program instructions are loaded and executed on a computer, all or some of the procedures or functions according to embodiments of the present disclosure are generated. The computer may be a general-purpose computer, a dedicated computer, a computer network, a network device, user equipment, or another programmable apparatus. The computer instructions may be stored in a computer-readable storage medium or transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (digital subscriber line, DSL for short)) or wireless (for example, infrared, wireless, or microwave) manner. The computer-readable storage medium may be any usable medium accessible by a computer, or a data storage device, such as a server or a data center, integrating one or more usable media. The usable medium may be a magnetic medium (such as a floppy disk, a hard disk, or a magnetic tape), an optical medium (such as a digital video disc (DVD for short)), a semiconductor medium (such an SSD), or the like.

It is clear that a person skilled in the art may make various modifications and variations to this disclosure without departing from the scope of this disclosure. In this case, if the modifications and variations made to this disclosure fall within the scope of the claims of this disclosure and equivalent technologies thereof, this disclosure is intended to include these modifications and variations.

What is claimed is:

1. A communication method, applied to a first network device, the method comprising:
    receiving a first position from a second network device, wherein the first position is a position of one or more subframes occupied by first information;
    determining a first offset, wherein the first offset is for determining a second position located in a first range that supports configuration of a multicast-broadcast single-frequency network (MBSFN) subframe;
    configuring the MBSFN subframe including the second position, the second position being obtained by offsetting the first position by the first offset; and
    sending the first offset and the first MBSFN configuration information to the second network device, wherein the first MBSFN configuration information is for determining a configuration state of the MBSFN subframe in the first range.

2. The method of claim 1, wherein the determining the first offset comprises:
    determining the first offset based on the first position and the first range.

3. The method of claim 1, wherein the first offset is an integer greater than 0 and less than 10.

4. The method of claim 1, wherein the first information comprises at least one of a synchronization signal and physical broadcast channel block, a system information block, or a paging message.

5. A communication method, applied to a second network device, the method comprising:
    sending, to a first network device, a first position of one or more subframes occupied by first information;
    receiving, from the first network device, a first offset and first multicast-broadcast single-frequency network (MBSFN) configuration information, wherein the first MBSFN configuration information is for determining a configuration state of an MBSFN subframe in a first range that supports configuration of the MBSFN subframe; and
    sending, on a time domain resource corresponding to a second position, the first information to a first terminal device, wherein the second position is a position obtained by offsetting the first position by the first offset, and a position of the MBSFN subframe comprises the second position.

6. The method of claim 5, wherein one or more subframes corresponding to the second position comprise a first subframe located outside a second range that is obtained by offsetting the first range by the first offset, and the method further comprises:

Sending, to the first terminal device, first indication information indicating to perform rate matching on a time domain resource corresponding to the first subframe.

7. The method of claim 5, the method further comprising:
    sending, to the first terminal device, second MBSFN configuration information for determining a configuration state of the MBSFN subframe in the second range, wherein the second range is the range obtained by offsetting the first range by the first offset.

8. The method of claim 7, wherein
    the MBSFN subframe comprises a second subframe located outside the first range after being offset by the first offset, the second MBSFN configuration information comprises second indication information indicating to perform rate matching on a time domain resource corresponding to the second subframe.

9. The method of claim 5, wherein the MBSFN subframe comprises a second subframe located outside the first range after being offset by the first offset, and the method further comprises:
    sending, to the first terminal device, second indication information indicating to perform rate matching on a time domain resource corresponding to the second subframe.

10. The method of claim 5, wherein the first offset is an integer greater than 0 and less than 10.

11. The method of claim 5, wherein the first information comprises at least one of a synchronization signal and physical broadcast channel block, a system information block, or a paging message.

12. An apparatus, comprising:
    a storage configured to store instructions;
    at least one processor communicatively coupled to the store and configured to execute the instructions to cause the apparatus to:
    send, to a first network device, a first position of one or more subframes occupied by first information;
    receive, from the first network device, a first offset and first multicast-broadcast single-frequency network (MBSFN) configuration information, wherein the first MBSFN configuration information is for determining a configuration state of an MBSFN subframe in a first range that supports configuration of the MBSFN subframe; and
    send, on a time domain resource corresponding to a second position, the first information to a first terminal device, wherein the second position is a position obtained by offsetting the first position by the first offset, and a position of the MBSFN subframe comprises the second position.

13. The apparatus of claim 12, wherein one or more subframes corresponding to the second position comprise a first subframe located outside a second range, the second range is a range obtained by offsetting the first range by the first offset, and the at least one processor is further configured to execute the instructions to cause the apparatus to:
    send, to the first terminal device, first indication information indicating to perform rate matching on a time domain resource corresponding to the first subframe.

14. The apparatus of claim 12, wherein the at least one processor is further configured to execute the instructions to cause the apparatus to:
    send, to the first terminal device, second MBSFN configuration information for determining a configuration state of the MBSFN subframe in the second range that is obtained by offsetting the first range by the first offset.

15. The apparatus of claim 12, wherein the MBSFN subframe comprises a second subframe located outside the first range after being offset by the first offset, the second MBSFN configuration information comprises second indication information indicating to perform rate matching on a time domain resource corresponding to the second subframe.

16. The apparatus of claim 12, wherein the MBSFN subframe comprises a second subframe located outside the first range after being offset by the first offset, and the at least one processor is further configured to execute the instructions to cause the apparatus to:
    send, to the first terminal device, second indication information indicating to perform rate matching on a time domain resource corresponding to the second subframe.

17. The apparatus of claim 12, wherein the first offset is an integer greater than 0 and less than 10.

18. The apparatus of claim 12, wherein the first information comprises at least one of a synchronization signal and physical broadcast channel block, a system information block, or a paging message.

* * * * *